PUNCHED TAPE EDITING MEANS

Filed Dec. 19, 1957 15 Sheets-Sheet 1

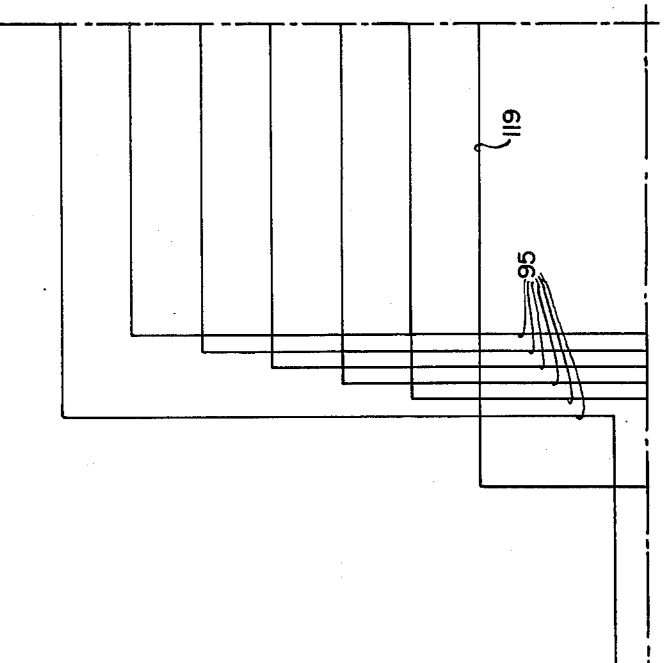

FIG. 1

FIG. 11

| | | |
|---|---|---|
| FIG. 1 | FIG. 2 | FIG. 3 |
| FIG. 4 | FIG. 5 | FIG. 6 |
| FIG. 7 | FIG. 8 | FIG. 9 |

FIG. 10

CODE FOR EDITING TAPE

SUBSTITUTION (substituting entry 0001 for entry 0001 on std. tape)

0001Tf . . . . . . . . . . . . . . Cr Lf

INSERTION (inserting entry 1122 after entry 0002)

e00021122Tf . . . . . . . . . . Cr Lf

ADDITIONAL INSERTIONS a1123Tf Cr Lf
a1124Tf Cr Lf

DELETION (deleting one entry after entry 0004)

s0004

ADDITIONAL DELETIONS (add one "u" for each entry to be deleted)

u

PUNCHED TAPE EDITING MEANS

Filed Dec. 19, 1957 15 Sheets-Sheet 5

Jan. 30, 1962 J. J. ACKELL ET AL 3,018,946

PUNCHED TAPE EDITING MEANS

Filed Dec. 19, 1957 15 Sheets-Sheet 7

Jan. 30, 1962 J. J. ACKELL ET AL 3,018,946

PUNCHED TAPE EDITING MEANS

Filed Dec. 19, 1957 15 Sheets-Sheet 8

Jan. 30, 1962 J. J. ACKELL ET AL 3,018,946

PUNCHED TAPE EDITING MEANS

Filed Dec. 19, 1957 15 Sheets-Sheet 9

Jan. 30, 1962 J. J. ACKELL ET AL 3,018,946

PUNCHED TAPE EDITING MEANS

Filed Dec. 19, 1957 15 Sheets-Sheet 10

Jan. 30, 1962 J. J. ACKELL ET AL 3,018,946

PUNCHED TAPE EDITING MEANS

Filed Dec. 19, 1957 15 Sheets-Sheet 13

Jan. 30, 1962 J. J. ACKELL ET AL 3,018,946

PUNCHED TAPE EDITING MEANS

Filed Dec. 19, 1957 15 Sheets-Sheet 14

United States Patent Office 3,018,946

Patented Jan. 30, 1962

3,018,946
PUNCHED TAPE EDITING MEANS

Joseph J. Ackell, Amityville, Herbert L. Paulding, Port Washington, and Richard T. Yu, New York, N.Y., assignors to Dow Jones & Company, Inc., New York, N.Y., a corporation of Delaware Filed Dec. 19, 1957, Ser. No. 703,788
18 Claims. (Cl. 234—25)

This invention relates to an apparatus or a system for automatically editing or producing a modified punched tape of the character used in controlling the operation of a line casting machine or the like. It is particularly concerned with the editing of the so-called "standing tape" used in accordance with the invention disclosed in the patent to Paulding et al., No. 2,788,886, granted April 16, 1957, for "Dual Tape Control for Line Casting Machines." Also, it may be used to advantage in producing a revised standing tape for use in connection with the perforating system disclosed in the Paulding et al. application Serial No. 565,202, filed February 13, 1956 which issued as Patent No. 2,973,897. On occasion it may be found desirable to use it in relation to the so-called "variable tape" utilized in connection with the above-mentioned systems. As will appear from the nature of the invention it may be used to provide a revised or corrected punched tape for a variety of other purposes.

In accordance with the invention, a new tape is punched which conforms essentially with an existing punched tape but embodies certain modifications of the data represented by the perforations in the existing tape. It may be utilized in any situation in which the existing punched tape carries certain code numbers preceding and identified with successive groups of perforations which control the desired operation of a line casting machine or the like. The code numbers, as disclosed in the above-mentioned patent and pending application, are provided in the tape in the form of perforations representing numbers, say from zero to 9,999. In accordance with the invention disclosed in the above-mentioned patent, each code number is identified with a particular stock in a tabulated report of stock transactions. To expedite publication of this information, it has been found desirable to control a line casting machine in part from a standing tape carrying such information as the names of the stocks, the dividend rates and the high and low quotations for the stocks during the period preceding the date of publication. The data with respect to high, low and final quotations and volume of sales of the stock as on the day of publication is included in data to be printed by control of the line casting machine from a variable tape which may be punched promptly at the close of the stock exchange on the day in question.

It will be apparent that many items printed under control of the standing tape will remain unchanged over a period of time whereas other items may require some change from day to day. Thus, on a particular day either the high or the low quotations for a specific stock from the beginning of the year up to the day in question may have been changed the day before. So, also, periodically the dividends to be reported will change. A particular stock will be dropped and it is then either necessary or desirable to remove the data concerning it from the standing tape. So also on occasion when a new stock is added to the list of those to be reported in relation to a particular exchange, it then becomes necessary to incorporate the usual information with respect to this at the appropriate point in the stock quotation data, in accordance with the alphabetical listing of the stock. This necessitates revision of the standing tape to provide the standing information regarding the new stock at the proper alphabetical location.

The present apparatus or system for producing a corrected or revised standing tape, for use in connection with the systems disclosed in the above-mentioned patent and pending application, includes a tape punching device which in accordance with the invention is of an improved character capable of operation at relatively high speed. This punching device is adapted to make each perforation in the tape as it is predetermined by the standing tape being revised or by the editing tape. Conventional tape punching devices of the character heretofore employed have involved an arrangement in which a series of punches to be operated to provide a particular line of perforations across the tape will be operated simultaneously after they have all been selected.

In the present system, electrical circuits involving a large number of relays, rectifiers, switches and the like are arranged to control the operation of the punches in the tape punching device, firstly under control of the standing tape until some correction or change is indicated by the editing tape. The latter then takes over control of the tape punching device to effect the correction, such as substituting new data in a particular entry, or the insertion of an additional entry or a plurality of entries at a particular point. If a change involves merely the deletion of an entry from the standing tape, this is brought about by suitable controls predetermined by the editing tape for stepping off a section of the original standing tape without corresponding actuation of the punches in the tape punching device to make corresponding perforatons in the new tape.

A feature of the invention is the provision of a stepping switch of known type in association with a tape box which serves to interpret the editing tape. The stepping switch mentioned, in response to the energizing of certain circuits, causes actuation of groups of relays which serve to store the information carried by the editing tape with respect to the code numbers identified with the several stock entries in connection with which, or adjacent to which, changes in the new tape are to be made. When the tape box which interprets the standing tape arrives at the same code numbers which are stored in the groups of relays mentioned, certain circuits are closed and others opened to swing the control over the new tape punching device from the standing tape to the editing tape or to bring about the stepping off of a section of the standing tape without causing operation of the tape punching device to reproduce items which have been dropped. The circuits which perform these last mentioned operations include a second stepping switch which is so connected with the groups of relays storing the code numbers from the editing tape as to bring about a comparison of the code numbers on the old standing tape with the stored code numbers taken from the editing tape. It is when these code numbers coincide that the circuits are modified to bring about the results mentioned.

For the purpose of bringing about a proper timing of the closing and opening of various circuits involved in the new system to achieve the results mentioned, a series of cams is provided on a shaft driven at a suitable speed, say 540 r.p.m. In the illustrative embodiment to be hereinafter described, ten such cams are provided to control the operation of the various relays embodied in the system and to close and hold closed certain circuits during predetermined portions of a cycle of revolution of the cam carrying shaft. In some instances two cams will jointly serve to hold a circuit closed throughout a number of revolutions of a shaft, once that circuit has been closed. The arrangement is such, however, that when opening of that circuit is predetermined by some other mechanism in the machine, the actual opening of the circuit will occur only when a particular one of the two cams predetermines its opening. Other objects, features and advantages of the invention will appear from the detailed description of an illustrative embodiment of the invention which will now be given in conjunction with the accompanying drawings, in which:

FIGS. 1–9, inclusive, collectively disclose a circuit diagram of the electrical connections involved in the new system;

FIG. 10 is a tabulation of various entries provided on the editing tape to bring about desired changes in the new tape from the lines of perforation provided in the old standing tape;

FIG. 11 is a diagram which simply shows how FIGS. 1–9, inclusive, should be arranged in relation to each other to show the complete electrical system;

Figure 2:
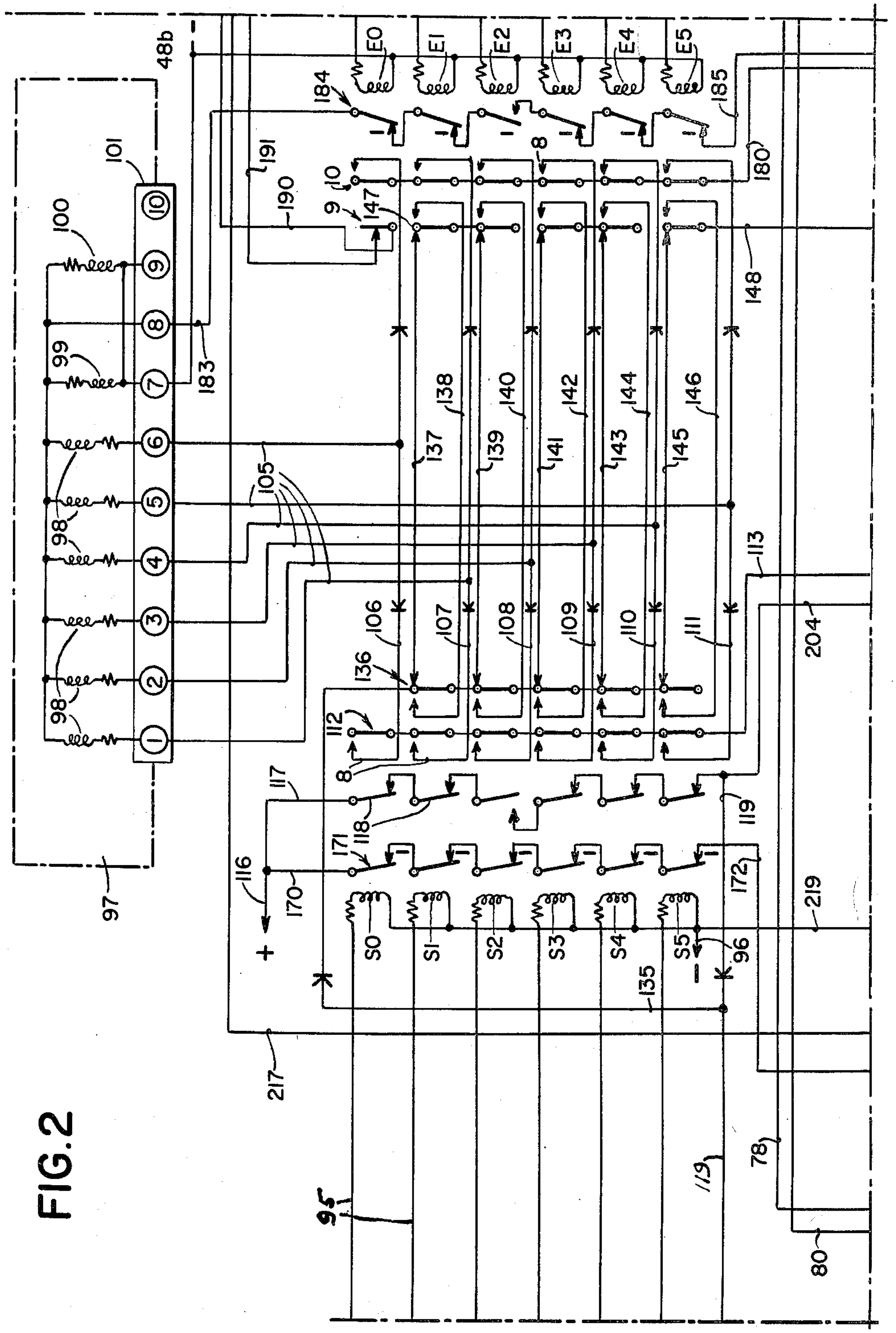

The circuits and various devices embodied in the new system will now be described in relation to the circuit diagram of FIGS. 1–9, inclusive. In this diagram the arrow heads in various lines which abut transversely extending lines in various circuits are to be understood to represent rectifiers which permit current flow only in the direction of the arrow heads from a positive source. Also it should be understood that resistors, shown in a conventional way, are connected in series with the coils of certain relays and other electromagnets involved in the system. In initiating the tape editing operation, the first step that is required is to transfer to the storage relays mentioned above the information carried by the editing tape as to the code number of the first stock item in relation to which, or subsequent to which, a change is to be made in the new tape. There is schematically indicated at 10 in FIG. 6, the pertinent features of the editing tape box which carries and interprets the editing tape. Correspondingly, in FIG. 4 there is indicated schematically at 11 the pertinent features of a standing tape box through which is fed and analyzed the standing tape which is to be corrected.

The editing and standing tapes each include groups of perforations or other signal control means which illustratively may be formed through the use of a key-operated mechanism of the type employed in the preparation of the tapes of the Paulding et al. patent and application referred to above. In many systems, however, it is advantageous to prepare the editing and standing tapes by means of a perforating mechanism similar to the combined tape punching device of the present invention, in which case the tape punching device may be controlled in a conventional manner from a suitable keyboard.

To initiate the operation of the machine, a switch 12 (FIG. 9) is manually closed by the operator while the various relays in the system are in the positions indicated in the circuit diagram. Closing of switch 12 causes delivery of current from the positive bus adjacent the switch through line 13 to and through the coil 14 of a relay E and thence to the negative bus line below relay E. A holding circuit for relay E is at this time closed through a circuit extending from a positive bus line at **14*a* through an arm 9 of a relay F to a contact 11 from which a line 14*b* extends to an arm 10 of relay E which at this time is shifted into engagement with contact 8 thereof. From here the circuit is completed through the coil 14** to the negative bus line.

Figure 6:
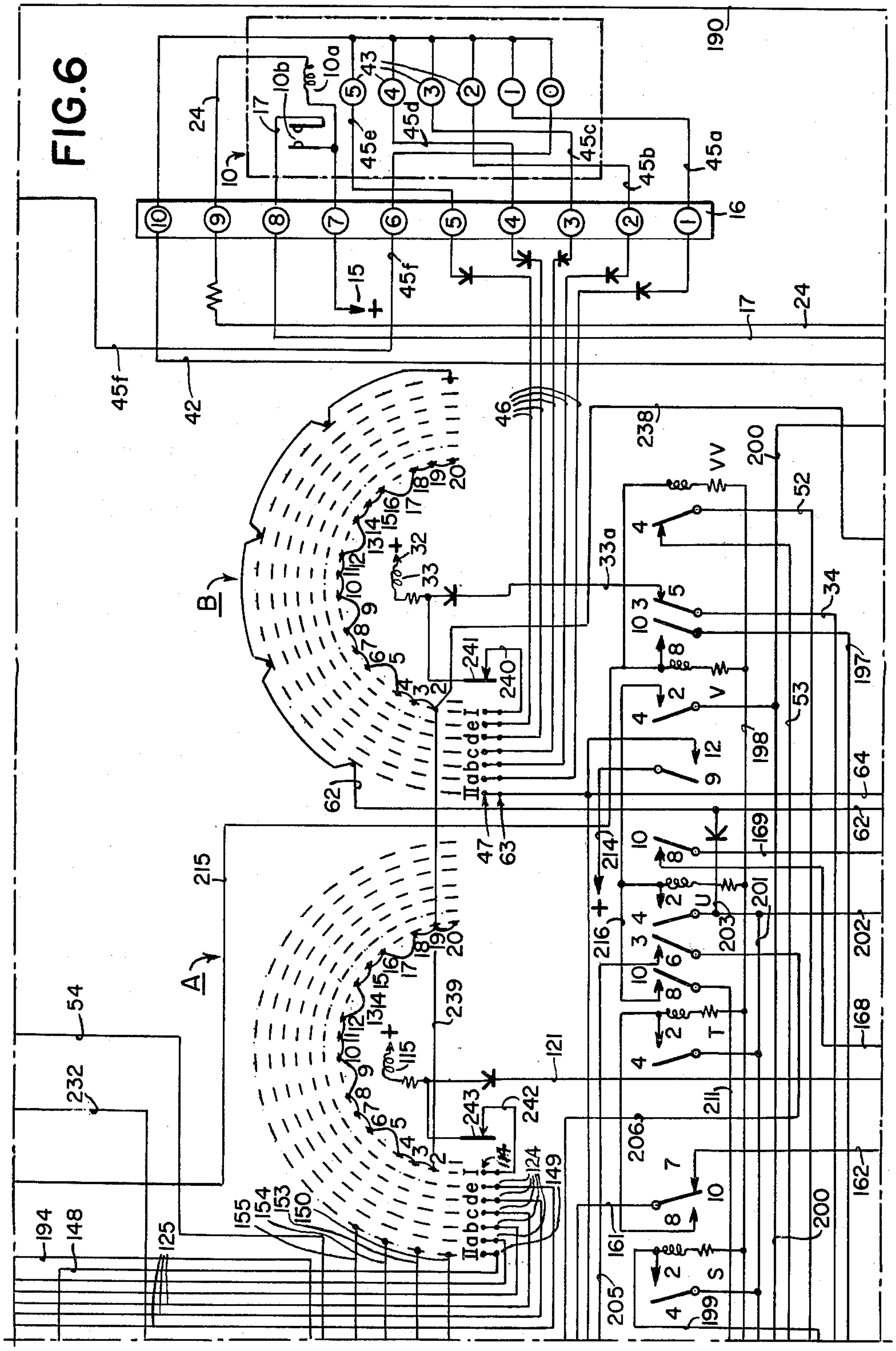
Figure 7:
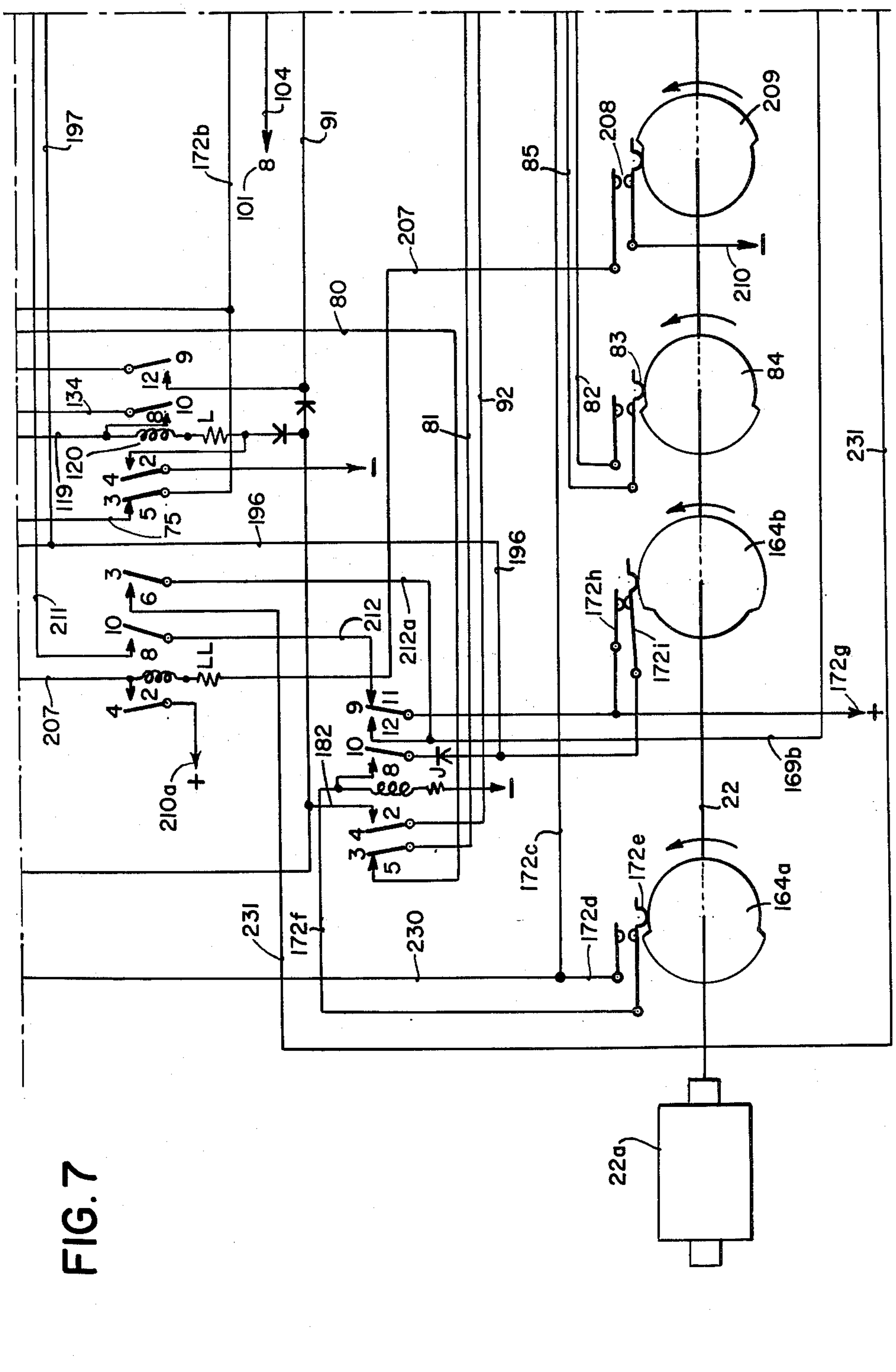

Activation of relay E brings about activation of a relay G. The circuit for this purpose may be traced from the positive bus line at 15 (FIG. 6) in the editing tape box through terminal 7 of a Jones plug 16 connected to this box, then through a cut-out switch **10*b*, which is normally closed but will be opened when too much slack is removed from the editing tape. From this switch the circuit continues through a line 17 to arm 9 of relay E which at this time is in engagement with contact 12 which is connected by a line 18 with arm 3 of relay F. From here the circuit extends through a line 19 to a switch 20 which is closed at the proper time by a cam 21 secured to a constantly revolving shaft 22 which may suitably be driven at 540 r.p.m. This shaft is driven by suitable connections from a motor 22*a* (FIG. 7). When switch 20 is closed, the circuit continues through line 23 to the coil 23*a*** of the relay G and then to the negative bus line indicated beneath this relay.

Actuation of relay G serves to connect the tape box 10 with a stepping switch B and also a circuit is substantially completed through a coil **10*a* in the tape box 10 which serves to actuate the tape feeding mechanism thereof. The circuit for the latter purpose may be traced from the positive bus 15 through coil 10*a*, a line 24 over to a branch line 25, along the latter to a further branch line 26, then through arm 4 of relay G, a line 27 to a branch line 28, then through a switch 29 to a line 31 connected with the negative bus line shown. Switch 29 is operated at an appropriate time in a cycle of the system by means of a cam 30 secured to the revolving shaft 22. Stepping switch B is of the character sold by C. P. Clare & Co. of Chicago, Ill., and has a magnet coil 33 which acts upon a spring urged arm carrying a pawl which imparts step by step movement to certain brush elements or arms in the switch. The actual stepping of these brush elements is effected by spring action but the coil 33 draws the actuating arm or lever mentioned into its active position for subsequent operation by the spring. The circuit through coil 33 extends from a positive bus at 32 through coil 33, then a line 33*a*, arm 3 of a relay V, line 34, arm 10 of a relay O, line 35, arm 9 of a relay ZZ, line 36, arm 3 of a relay W, line 37 across to line 26 from which the circuit is completed, in the manner explained above, through relay G and switch 29 to the negative bus terminal at 31 whenever the tape feed cam 30 acts upon switch 29**.

Connection of the tape box 10 with the various contacts in the stepping switch B so as to energize selected ones of these contacts, depending upon the position of the brush elements in the stepping switch and the particular feeler pins in the tape box which are alined with perforations in the tape at a particular instance, will now be explained.

Figure 8:
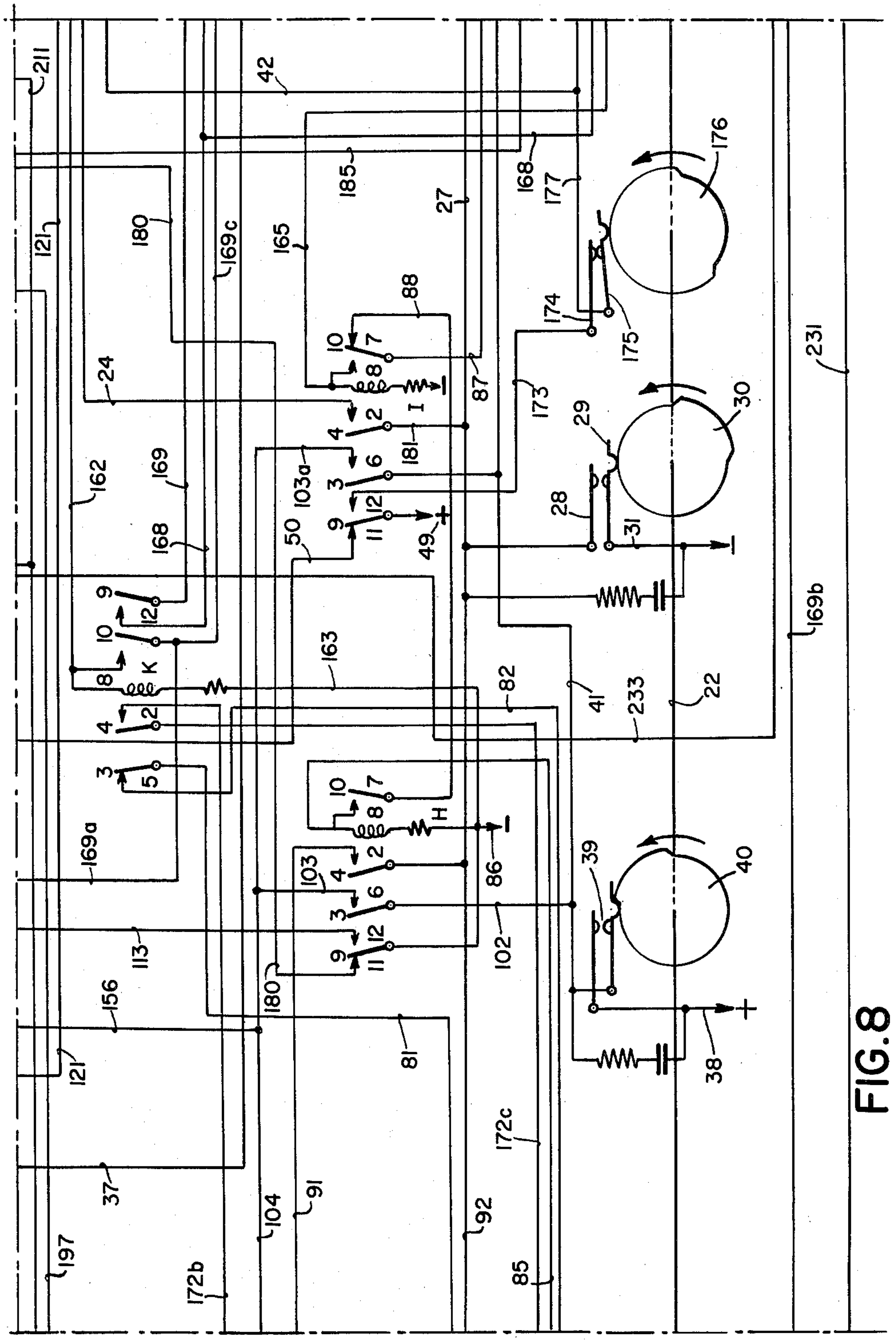
Figure 9:
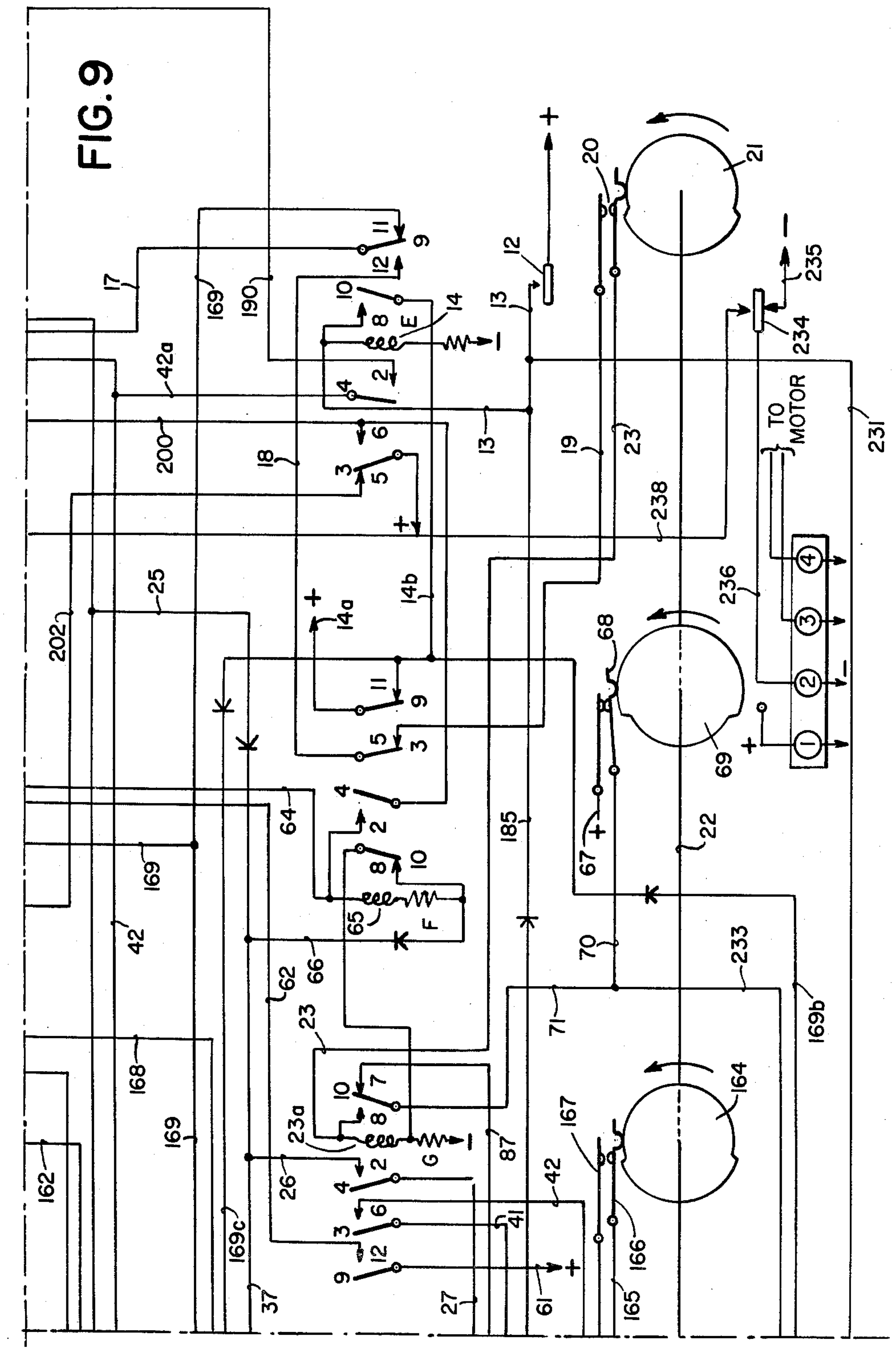

Current is derived for this purpose from a positive bus line indicated at 38 in FIG. 8, then through a switch 39 arranged to be operated at an appropriate time in the cycle by a cam 40 secured to the shaft 22. From switch 39 the circuit continues through a line 41, arm 3 of relay G, a line 42, to a series of branch lines extending through feeler elements 43 of the tape box 10. It will be understood that when any one of the feeler elements is permitted to pass through a perforation in the tape, a circuit will be continued at this point. The feeler elements marked 1, 2, 3, 4, and 5, respectively, are connected by lines **45*a*, 45*b*, 45*c*, 45*d* and 45*e*, respectively, and corresponding contacts in the Jones plug 16 with corresponding lines 46 extending to various contacts in the stepping switch B. Thus the circuit passing through feeler pin 1** extends to the contact marked *a* at the lower left end of the arcuate group illustrated for stepping switch B. Pins 2, 3, 4 and 5 are smiilarly in circuits to the contacts *b*, *c*, *d*, and *e*, respectively.

It should be explained that while the stepping switch is schematically illustrated as involving a plurality of groups of contacts arranged in arcs of progressively greater radius, in the actual construction these groups of contacts are in parallel planes and disposed along arcs of the same radius. For each group of contacts there is provided a brush arm which steps around successively through the twenty different positions in which the contacts are disposed in each of the arcuate groups. Actually there are two sets of such brush arms so that as the first set is stepped beyond the No. 20 contacts the other set is engaged with the No. 1 contacts. The lines 46 are connected with the axes of inner ends of the brush arms and thus connected into whichever group of contacts may at any instant be engaged by the outer ends of the brush arms. These brush arms are collectively indicated at 47 in FIG. 6. It should be further explained that the contacts in each of the groups designated *a*, *b*, *c*, *d*, and *e* have every fourth contact interconnected. Thus, contacts in positions 1, 5, 9, 13 and 17 are interconnected. Similarly, those in positions 2, 6, 10, 14 and 18 are interconnected. Those in positions 3, 7, 11, 15 and 19 are likewise interconnected and those in positions 4, 8, 12, 16 and 20 are interconnected. Those contacts in the group designated I have contacts 2, 3, 4, 6, 7, 8, 10, 11, 12, 14, 15, 16, 18, 19, 20 interconnected. Contacts in positions 1, 5, 9, 13, and 17 are not interconnected with the others or with each other. In the arcuate group of contacts designated II, the contacts in positions 4, 8, 12, 16 and 20 are interconnected. The remaining contacts in this group are independent of each other.

Figure 3:
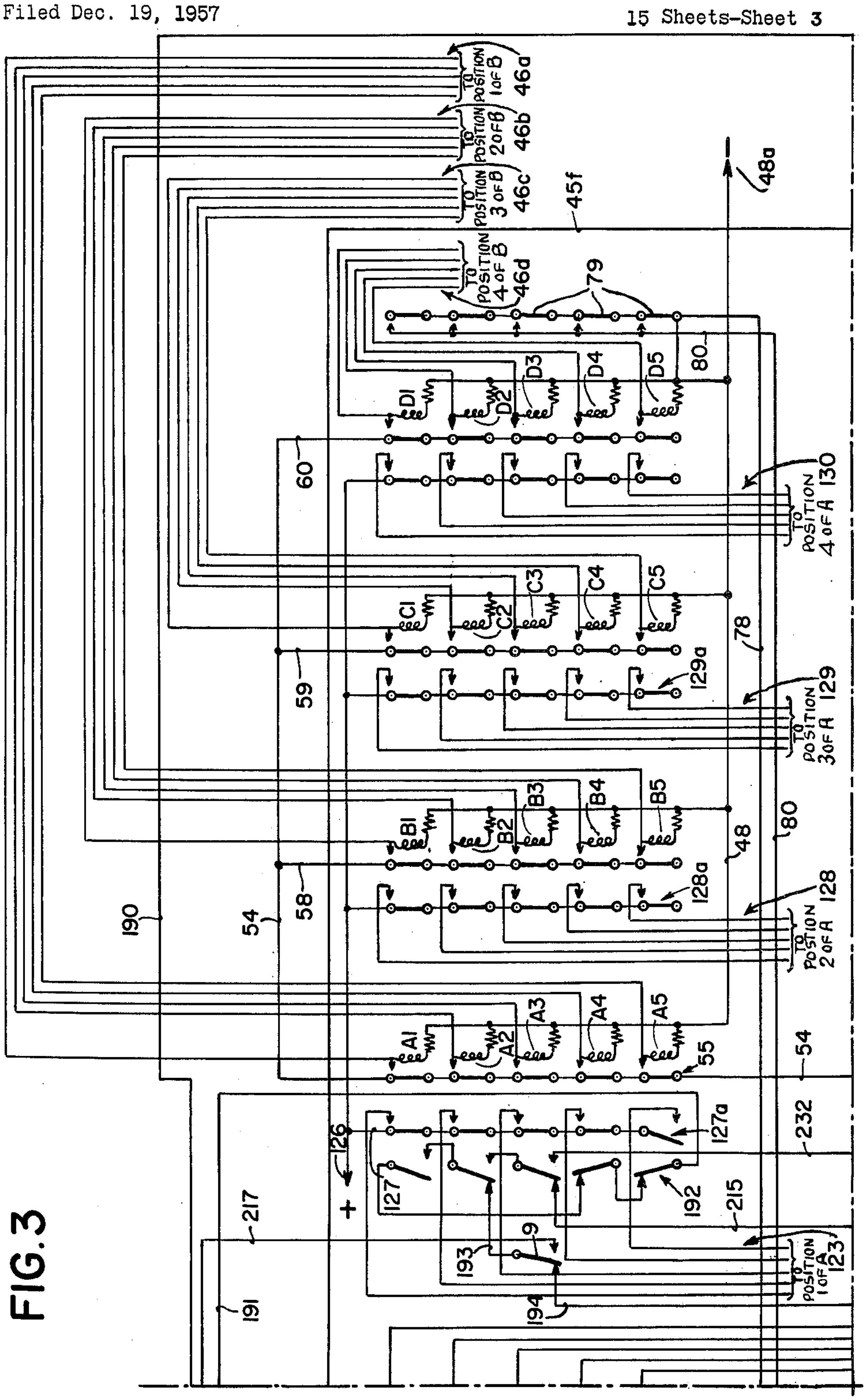
Figure 4:
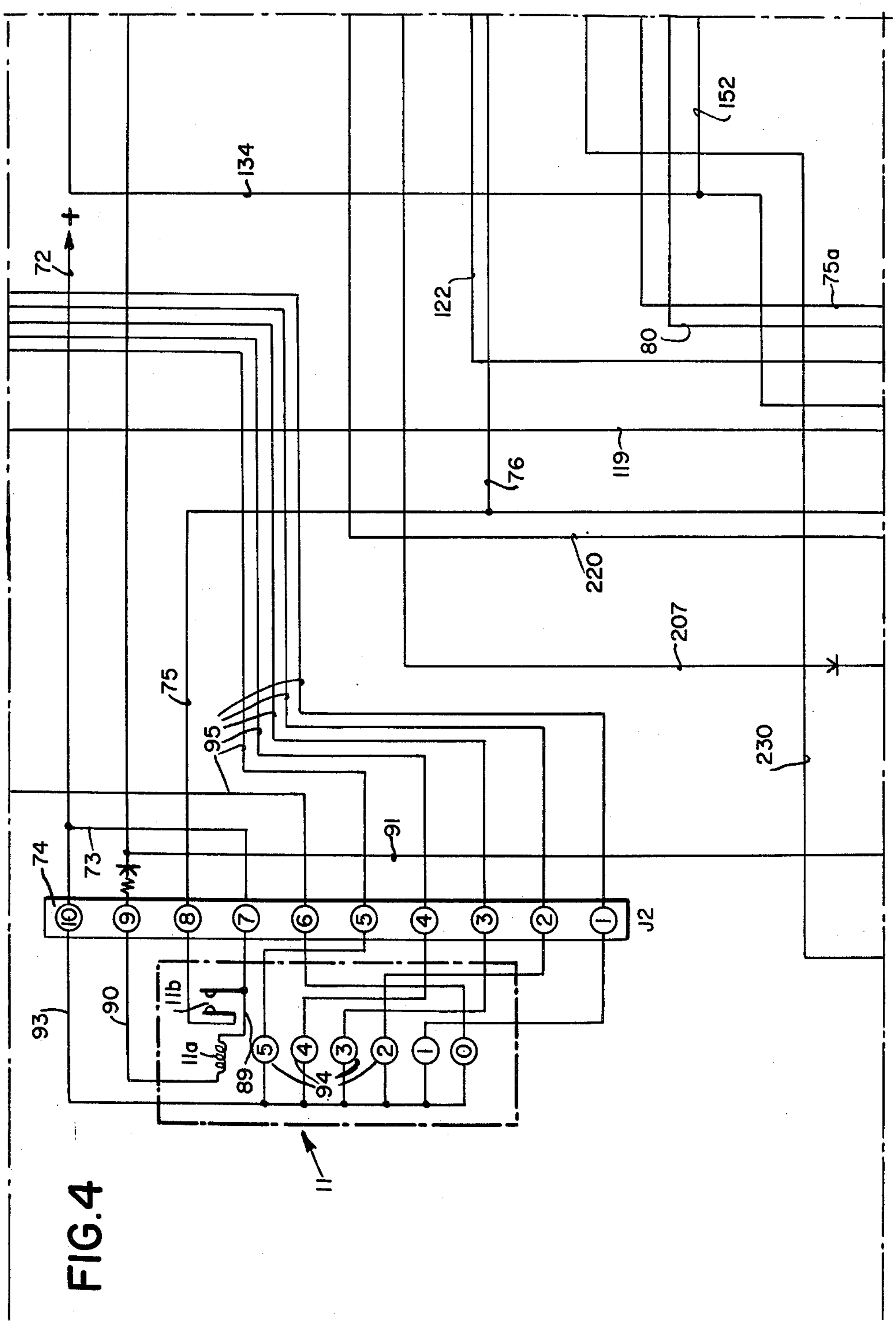

Now as the brush arms 47 are stepped successively from one position to the next, they serve to connect contacts in the groups *a*, *b*, *c*, *d*, and *e* with the storage relays shown in FIG. 3. These are designated A1–A5, B1–B5, C1–C5 and D1–D5. When the brushes 47 are in engagement with the contacts of position 1 in stepping switch B they continue the circuits from the lines 46 previously mentioned to the lines 46a at the point indicated in FIG. 3 as identified with "Position 1 of B." From this point it will be seen that the circuits continue through the five lines 46a over to the group of relays A1–A5 and from the latter the circuits are completed through a line 48 to the negative bus line at the point 48a. Thus it will be seen that certain circuits will have been completed from the positive bus line 38 to and through one or more of the relays in the group A1–A5. The particular relays in this group which will have been energized will depend upon the perforations in the tape through which pins 43 have passed as the brush arms 47 are in the No. 1 position of the stepping switch. When these brush arms shift to the No. 2 position, circuits will similarly be completed to relays of the group B1–B5. When the brush arms are shifted into the No. 3 position, similar circuits will be completed to the relays of the group C1–C5 and, similarly, when the brush arms 47 are shifted to the No. 4 position, circuits will be completed to the group of relays D1–D5.

Since, according to the code system involved in the disclosed embodiment of the invention, each of the numbers zero to 9 has a perforation in the zero position across the tape, a direct connection is provided from the tape box 10 to a relay EO (FIG. 2) whenever the circuits through the feeler pins are completed in the manner explained. This circuit passing through feeler pin 0 extends through line 45f up and over to the relay EO and thence to a negative bus at point 48b.

As the groups of relays A1–A5, B1–B5, C1–C5 and D1–D5 are energized in the manner explained above, holding circuits are created for retaining them in activated condition until such holding circuits are broken in the course of operation of the system. The common holding circuit for all of the relays mentioned starts at the positive bus 49 in FIG. 8 through arm 11 of a relay I to a line 50, then through arm 9 of relay Z to a line 51, then through arm 9 of relay W to line 52, then to arm 4 of relay VV to line 53 and along this to arm 3 of relay O and then upwardly through line 54 to a series of switch arms 55 (FIG. 3). These switch arms, when engaged with the adjacent contacts of the relays A1–A5, will complete a circuit through line 48 to the negative bus at 48a. Line 54, it will be noted, has branches 58, 59 and 60 each carrying switch arms similar to those designated 55 and each adapted to engage a contact associated with one of the coils in the relays of the groups B1–B5, C1–C5 and D1–D5, thus serving to hold in actuated condition any of these relays which have been operated in the course of the stepping of the brushes 47 around the contacts of stepping switch B.

Assuming now that the tape in the editing tape box 10 has had four lines of perforations analyzed to determine the code number of the stock requiring change in its data and that relays in the groups A1–A5 to D1–D5 have been energized and held to correspond with the code number, provision is made for stopping further stepping of the tape in tape box 10 and of the brush arms 47 in the stepping switch B. It should be noted that after the code perforations in the fourth line have been transmitted to the relays D1–D5 the brush arms 47 will have been stepped to the No. 5 position and the tape in box 10 will have been fed to the next line of perforations before this phase of the operation is stopped. This is because the cam 40 which controls the circuits to relays D1–D5 acts early in the cycle of shaft 22 while the cam 30 which controls the circuits through coils 10a and 33 acts at a later point in the cycle. The stopping of the tape feed and the stepping of arms 47 is accomplished by releasing the relays E and G and for this purpose a relay F is energized. The circuit through relay F may be traced as follows: from the positive bus line 61 (FIG. 9) through arm 9 of relay G, then line 62 to the contact in stepping switch B which is in position 4 and in the arcuate groups designated II. At this time the brush arms 47 will still be in the No. 4 position, since the energizing of coil 33 as last described will simply tension a spring on an arm which carries a pawl to actually shift the arms, so that the contact mentioned at the upper end of line 62 will be connected, through the brush arm which engages it, with the contact 63 from which the circuit continues to line 64 to the coil 65 of relay F. From here the circuit continues through line 66 over to line 26, arm 4 of relay G, line 27, switch 28, 29 and line 31 to the negative bus.

Energizing of relay F will open the holding circuit for relay E which involves lines 14b and 14a and the arm 9 of relay F which will now have been shifted away from contact 11. The holding circuit for relay G has two paths, one which initiates its operation, as explained above, upon the rotation of the cam 21. This cam serves to hold the circuit closed over an arc of about 150°. Relay G is held energized during the remaining portion of each revolution of shaft 22 by a cam 69 secured thereto. This, over an arc of about 260°, will provide a circuit from a positive bus at 67 through switch arm 68 and line 70 to a line 71 and arm 10 of relay G, which at this time will have been shifted toward the left. From here the circuit is completed through coil 23a to the negative bus line. This arrangement is such that relay G will not be released so long as the cam 69 is active, but when the low part of this cam is brought opposite switch arm 68 to open the latter, the relay G will be released because the holding circuit controlled by cam 21 requires the arm 3 of relay F to be in its right hand position whereas with relay F energized, the arm 3 will be swung toward the left away from contact 5 to open that holding circuit for relay G. It will be seen that relay G will not be released to break the coils 10*a* and 33 until after these have been energized in this cycle.

At this time the system is set up to connect the standing tape box 11 with the tape punching device for the new tape to be prepared. Also, the circuits established by the feeler pins of tape box 11 are interconnected with the groups of storage relays A1–A5 to D1–D5 for a comparison of the code numbers in the standing tape with that set up in these storage relays. As a first step in setting up these circuits, the energizing of one or more of the relays D1–D5 in the manner explained above, serves to energize a relay H (FIG. 8). The circuit for this purpose may be traced as follows: from a positive bus at 72 (FIG. 4) which extends through a line 73 to and through a contact 7 of a Jones plug 74 and from the latter through a cutout switch 11*b* of tape box 11 which is normally closed and only opened when the tape being fed through the box 11 becomes too taut. From this cutout switch the circuit passes through contact 8 of Jones plug 74, then line 75 to a line 76 connected with a switch 77. The latter is a double throw switch which is adapted to place the system either in a condition to effect the editing operation now being described or to simply set up the system to connect the standing tape in box 11 to the tape punching device for the new tape. For the editing operation, the arms of the switch are swung upwardly so that line 76 is connected with line 78 which extends upwardly and then over to the right to a series of switch arms 79, connected in parallel, one or more of which will have been drawn toward the left by actuation of corresponding relays in the group D1–D5. From here the circuit continues through line 80 which extends over to the left and downwardly to a relay J (FIG. 7). Here the circuit extends through arm 3 of relay J and then through line 81 to arm 3 of a relay K (FIG. 8). From this point the circuit continues through line 82 to a switch arm 83 adapted to be actuated into closed position at the appropriate time by a cam 84 secured to the shaft 22. From the switch 83 the circuit continues through a line 85 to the coil of relay H and down to a negative bus line at 86. Relay H is held in energized condition when thus actuated in a manner similar to relay G. During a portion of the revolution of shaft 22 it is held actuated by the cam 84 and during the balance of the revolution of shaft 22 it is held actuated by the cam 69. The holding circuit involving the latter may be traced as follows: from positive bus 67, switch 68, lines 70 and 71, arm 10 of relay G, which at this time is toward the right, then through line 87 to switch arm 10 of relay I, which is at this time toward the right, and thence through line 88 to arm 10 of relay H, which at this time will have been shifted toward the left. The circuit is completed through the coil of relay H to the negative bus at 86.

The energizing of relay H serves to place the tape feeding mechanism in tape box 11 in condition for operation in response to the rotation of the cam 30 on the rotating shaft 22. For this purpose the circuit extends from the positive bus 72 (FIG. 4) through line 73 to a branch line 89, then through coil 11*a* of the tape feeding mechanism in box 11 to line 90 and branch line 91, then to arm 4 of relay H, and from here through line 92 and branch 28 to switch 29 actuated by the cam 30 down to the negative bus at 31. Thus a circuit is completed from positive bus 72 to negative bus 31 upon each revolution of the cam 30 and this will bring about operation of the tape feeding mechanism in box 11. It will be understood that operation of this tape feeding mechanism also activates the feeler mechanism of the box 11. This serves to connect the feeler pins with a group of relays S0–S5 (FIG. 2). The circuit for this purpose extends from positive bus 72 through a line 93 having six branches which extend through contacts of the feeler pins 94 designated 0–5, inclusive, in tape box 11. Whichever of these feeler pins is alined with a perforation in the tape will continue the circuit through its related line 95 which extends to one of the relays S0–S5, all of which have a common connection to a negative bus at 96.

At this time also the tape punching device, which is to produce the revised punched tape, is connected into the system. This tape punching device is indicated at 97 in FIG. 2 and is provided with 7 punches, as will be more fully explained hereinafter. Six of these punches are identified with the 0–5 positions of the perforations across the tape and one is identified with a smaller perforation used in advancing the tape. Electromagnets shown as coils 98 are provided in this device for operation of the punches for making the 0–5 perforations and magnet 99 is provided for making the tape feeding perforation. A further magnet 100 is included in the device for advancing the tape therein step-by-step. A Jones plug 101 serves to connect various circuits from the tape punching device into the system as a whole. Current from the positive side of the power source is delivered to the tape punching device through the terminal 8 of plug 101. The source for this purpose is indicated at 38 in FIG. 8 adjacent the cam 40. At the appropriate time in the cycle of cam 40 switch 39 is closed, as explained, and current will be passed to line 102, then from arm 3 of relay H, now energized, to contact 6, then by line 103 to the line 104 which, as indicated, is connected with the No. 8 contact of Jones plug 101. A part of the current flows through the coil magnets 99 and 100 and is delivered to the negative bus at 43*b*. This serves to perforate a tape-feed perforation and to shift the tape feeding pawl into active position ready for feeding of the tape by spring action when the coil 100 is deenergized. Parallel circuits are formed through one or more of the coils 98 and then down through lines 105 to lines 106, 107, 108, 109, 110 and 111, respectively. Each of these lines is connected with a contact 8 associated with one of a group of arms 112 which are connected in parallel with a line 113. Circuits will be completed from the contact 8 to those arms 112 which have been shifted toward the left by the energizing of particular relays in the group S0–S5. Line 113 extends downwardly to a contact 12 which at this time will engage arm 9 of energized relay H and from here the circuit is completed to the negative bus line at 86. It will thus be seen that a line of perforations will be formed in the tape of the perforator 97 in accordance with those of the relays, S0–S5, which have been energized through the coaction of the feeler pins 94 with the standing tape in the box 11. Also, a tape feed perforation will be provided in the new tape at the same time.

At this time also the digit of a code number represented by the perforations in the tape being analyzed by box 11, and which is now set up in relays S0–S5, will be compared with the corresponding digit in the code number previously appearing in the editing tape and now being stored in the relays of groups A1–A5 to D1–D5. For this purpose a second stepping switch designated A in FIG. 6 is provided. This stepping switch is identical in construction with that described above as switch B with the exception that the outer arcuate row of contacts designated II has its several contacts interconnected in the same manner as those in the rows *a*, *b*. *c*, *d*, and *e*, i.e., every fourth contact is interconnected. Stepping switch A is provided with a series of brush arms 114 adapted to shift step-by-step through the twenty positions indicated. Actually, as explained, in both stepping switches A and B, there are two sets of such brushes so that as the one set leaves position 20, the next set engages the contacts in position 1.

Stepping of the brush arms 114 is effected by a magnet 115 which is energized periodically under the conditions now being described upon each revolution of the cam 30.

It should be mentioned at this point that as a preliminary to the stepping of the brush arms of switch A, it is necessary to energize a relay L in the system. This relay is energized in response to a line feed (*Lf*) signal in the standing tape being analyzed in box 11. Such a signal is provided in advance of the mode number perforations in the tape. This *Lf* signal, as explained in the application of Paulding et al., Serial No. 565,202, involves a perforation in the No. 2 position across the tape. Therefore, as this is being analyzed, the relay S2 will be energized. Upon energizing that relay, current is supplied to the actuating coil of relay L. The circuit for this purpose may be traced as follows: from positive bus 116 (FIG. 2) through line 117, then through a group of switch arms 118 controlled by the relays S0–S5. It will be noted that when the arm identified with relay S2 is shifted toward the right, the circuit will be completed to the lower end of arms 118 and will be continued through line 119 over to the left and down to the coil 120 of relay L. From here the circuit is continued through line 91 to arm 4 of relay H, now energized, then to line 92, switch contacts 28, 29 and then to the negative bus at 31. This circuit is, of course, completed only when the switch arm 29 is actuated by the cam 30. When the solenoid L is energized in the manner explained, a holding circuit is provided by the arm 4 thereof which is connected with a negative bus and is swung into engagement with contact 2 of the relay. The connection to positive extends from the top of coil 120 to contact 8 and arm 10 of relay L, then through line 134, arm 4 of relay M to line 133 over to arm 9 of a relay Y and from here through line 132 to arm 10 of a relay ZZ and up to positive bus 131.

Returning now to the stepping of the switch arms 114, the circuit through the stepping coil 115 for this purpose extends from the positive bus line indicated above the coil, downwardly through a line 121 which extends across to the left of the diagram and then upwardly to the switch 77. This, as explained, is of double throw construction and when in the edit position will connect line 121 with the line 122. The latter extends downwardly to arm 9 of relay L which is now engaged with contact 12 so that the circuit continues to line 91, then to arm 4 of relay H, on to line 92 and the switch 28, 29, controlled by the cam 30, to negative along line 31. Thus, upon each tape feeding operation, the brush arms 114 will be shifted one step into a new position. As will be explained, however, this occurs only through the code number portion so that the brush arms will remain on the contacts in one of the positions 1, 5, 9, 13 and 17.

Let us assume now that the brush arms 114 are in engagement with the contacts in the No. 1 position of switch A. Those contacts designated *a, b, c, d* and *e* in this position are connected with correspondingly lettered lines designated 123 in FIG. 3. The brush arms then serve to connect these lines with contacts 124 of the stepping switch which are in turn connected through lines 125 with corresponding ones of the relays E1–E5. At this time the setting of the relays A1–A5 will be transferred or duplicated in the relays E1–E5. This is by virtue of the fact that current from a positive bus 126 (FIG. 3) is connected with a downwardly extending line 127 having connected therewith in parallel a series of switch arms 127*a*. These switch arms are shifted toward the right whenever their corresponding relays A1–A5 are energized. When shifted to the right, the arms 127*a* will connect the positive bus with their corresponding lines in the group 123 and these in turn, through the connections mentioned, will transmit the current to the corresponding relays of group E1–E5, the opposite terminals of which are connected to the negative bus at 48*b*. As will be explained later, the setting of the relays E0–E5 will be compared with the setting of relays S0–S5 and according to whether they differ or coincide will predetermine the nature of the continued operation of the system. As the brush arms 114 move to position 2, the *a, b, c, d* and *e* contacts of the group 124 will be connected with corresponding contacts at position 2. These, as indicated in FIG. 3, are connected with correspondingly designated lines in the group 128 selected ones of which are connected into the positive bus 126 through arms 128*a* of those relays in the group B1–B5 which have been energized. The circuits thus completed to positive at 126 will be completed to negative at 48*b* through lines 125 and those relays of group E0–E5 which correspond with the energized relays of group B1–B5. Similarly, when the brush arms 114 are shifted to the No. 3 position, they serve to connect a series of lines 129 with corresponding contacts of group 124 so that through the actuation of selected switch arms 129*a* associated with relays C1–C5, a corresponding setting of relays E1–E5 may be established. As the brush arms 114 are stepped to the No. 4 position, they similarly, serve to connect a series of lines 130 with the relays E1–E5 so that the setting of relays D1–D5 may be transferred to relays E1–E5. This enables comparison of the code numbers set up digit by digit in the relays S0–S5 with the stored four digit code numbers set up in the relays A1–A5 to D1–D5.

Figure 5:
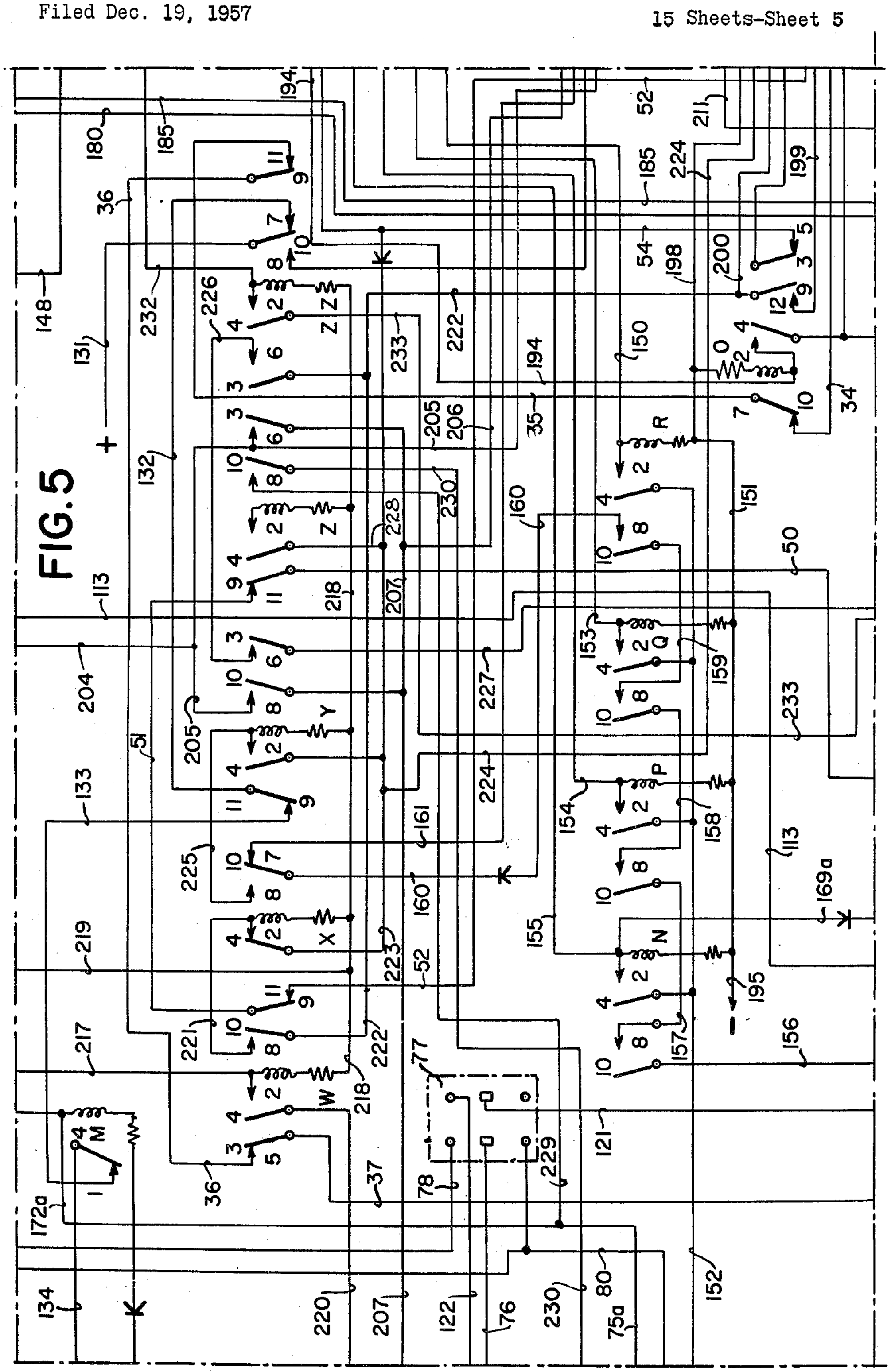

Returning now to the comparison of the settings of the groups of relays S1–S5 and E1–E5, the circuit for this begins at a positive bus 131 (FIG. 5). From here the circuit extends through arm 10 of relay ZZ and then line 132 to arm 9 of relay Y from which it continues through line 133 to arm 4 of a relay M, all of these relays being at rest. From relay M the circuit continues through line 134 to arm 10 of relay L which is in energized condition so that the circuit continues through contact 8 to line 119 and then up to a branch line 135 from which the circuit extends over to a series of switch arms 136 of the relays S1–S5. By a series of lines 137, 138, 139, 140, 141, 142, 143, 144, 145 and 146, the arms 136 are separately connected with corresponding arms of a group 147 identified with relays E1–E5. The arrangement is such that if the settings of the relays S1–S5 and E1–E5 coincide, a circuit will be completed through certain of the lines indicated down to a line 148. However, if the settings of the two groups of relays do not coincide, this circuit will be left open at one point or another. If the circuit is left open in this manner nothing further occurs at this stage of the comparison. However, if the settings of the two groups of relays coincide and the circuit is completed to the line 148, it is carried to contact 149 of the stepping switch A. When the brushes 114 of the latter are in the No. 1 position, contact 149 will be connected with a line 150 which extends over to the coil of relay R and from there the circuit is completed through a line 151 to the negative bus shown at the end 195 thereof. A holding circuit for the relay R which is thus energized is provided from the positive bus 131 through lines 132, 133 and 134 and a branch line 152 to arm 4 of relay R now engaged with contact 2. The current thus delivered to the coil of the relay passes to negative through the line 151.

When the group of relays E1–E5 carries the setting of relays B1–B5, the brushes 114 will be in the No. 2 position, as previously indicated, and therefore the completion of a circuit through line 148, due to coincidence of the settings of relays S1–S5 with those of relays E1–E5, will now be carried from contact 149 through one of the brush arms 114 to a line 153. The latter extends to the coil of a relay Q, the opposite side of which is connected to negative through line 151. It is held in energized condition in the same manner as relay R. When the brush arms 114 are swung into position No. 3, a circuit completed in the above-described manner to the contact 149 will be carried to a line 154 by the brush arm cooperating with the group II contacts of switch A. This line extends to the coil of relay P, the opposite side of which is connected to negative through the line 151. This relay, when so energized, is held in the same manner as relay R. As the brush arms 114 swing to the No. 4 position, the circuit completed upon coincidence of the settings of relays S1–S5 and E1–E5, will be carried from contact 149 to a line 155 which is connected with the coil of a relay N, the opposite end of which is connected to negative through line 151. This relay is likewise held in energized condition in the same manner as relay R.

It will be understood that so long as there is some variance between the settings of the relays of groups S1–S5 and E1–E5 in their representation of any one of the four digits of a code number, the standing tape being analyzed in box 11 will continue to control the operation of the punches in the perforator 97. In this way the data on the standing tape with respect to the various stocks up to the one whose code number is stored in relays A1–A5 to D1–D5 will be introduced into the new tape. However, when all four of the relays N, P, Q and R are energized through the coincidence of the code number being analyzed in the standing tape with that stored from the edit tape in the relays A1–A5 to D1–D5, the control over the perforator 97 will shift over to the edit tape in the manner now to be explained.

When the four relays N, P, Q and R have been energized in the manner indicated, a relay K will be energized. The circuit for this purpose may be traced from the positive bus line 38 through switch 39 actuated by cam 40, then through line 102 and arm 6 of relay H which at this time is still energized. Then through line 103 to a line 156 which, because of the energized condition of relays N, P, Q and R, is connected through lines 157, 158 and 159 with the line 160. From the latter the circuit extends to arm 10 of relay X then down through line 161 to arm 10 of relay S and then through line 162 to the coil of relay K which is connected through line 163 with the negative bus at 86.

Energizing of relay K releases relay H. It should be noted that at this time relay H is being energized during a portion of each revolution of shaft 22 by the circuit including switch 83 operated by cam 84. That circuit extends through arm 3 of relay K which, due to energizing of the latter, will be drawn toward the left and will break the circuit between lines 82 and 81.

Energizing of relay K will bring about the energizing of relay I under control of a cam 164 on the rotating shaft 22. The circuit for this purpose may be traced from the negative bus connected with the lower end of the coil of relay I through the latter and then a line 165 to a switch arm 166 actuated by the cam 164. At the appropriate time in the cycle this switch arm will engage a contact on line 167 which then continues the circuit through a line 168 to arm 9 of relay K which has been shifted toward the left. From this arm the circuit continues through line 169 to arm 9 of relay E which has been released. From the latter the circuit continues through line 17 and cut-out switch **10*b*, to the positive bus at 15. Relay I is held energized during a part of the revolution by cam 164 through the circuit mentioned and it is held during the remainder of the revolution of shaft 22 by the holding cam 69. The circuit for this purpose may be traced from positive bus 67 through switch arm 68, lines 70 and 71, arm 10 of relay G which is now released, line 87 to arm 10** of relay I which is at this time shifted toward the left and connected with the upper end of the coil of relay I.

When relay K is energized it will also cause relay J to be energized by a cam **164*a* on the shaft 22. The circuit for this purpose extends from positive bus 72 (FIG. 4) through the line 73, switch 11*b*, line 75 to arm 3 of relay L, when released, a line 172*b* to arm 4 of relay K, then through line 172*c* to line 172*d* having a contact arranged to be engaged by arm 172*e* actuated by cam 164*a*. From here the circuit continues through a line 172*f* to the coil of relay J and on to the negative bus at that point. Relay J is held, during that portion of the revolution of shaft 22 in which cam 164*a* is not active, by a cam 164*b*. The circuit extends from positive bus 172*g* through a line 172*h* which is engaged by switch arm 172*i* when the cam 164*b* is active. From arm 172*i* the circuit continues to the arm 10 of relay J which at this time is shifted toward the left to connect with the upper end of the solenoid of the relay. Thus the cams 164*a* and 164*b* jointly hold the relay J energized until the circuit controlled by cam 164*a*** is opened at some point, as by release of relay K.

Relay K, when once energized, is held by three different holding circuits all of which must be broken in order to release the relay. These operate through arm 10 of the relay. One circuit to this arm is controlled by contact 11 of relay F connected with line **169*c* and engaged by arm 9 of relay F connected with the positive bus at 14*a*. Another is controlled through line 169*a* by arm 4 and contact 2 of relay N and arm 4 and contact 1 of relay M up to positive at 131. The third holding circuit is controlled by arm 11 of relay J when the latter is energized. This arm 11, it will be noted, is connected to a positive bus. From contact 12 of relay J the circuit extends through line 196*b* over to the right and then up to line 169*c* which connects with arm 10** of relay K.

When the system is in the condition last explained a tape feed signal in the standing tape which regularly follows the four digits of the code number, will cause relay M to be energized momentarily. The tape feed signal, as explained in the above-mentioned patent and pending application, constitutes an absence of any perforations in the positions 0 through 5 of the tape. The circuit which energizes relay M may be traced from the positive bus at 116 (FIG. 2) downwardly through line 170 and the series of arms 171 of relays S0–S5 which will all be in the position indicated because none of these relays will be energized at this time. Line 172 in contact with the lowermost arm in this group extends to the coil of relay M and from here through the line 91 to the arm 4 of relay H, which is, at the moment, still energized. This, through line 92, connects with the negative bus line 31 through the actuation of switch arm 29 by cam 30. Energizing of relay M in this way opens the holding circuits for the relays N, P, Q and R and also relay L, since all of these holding circuits pass through arm 4 and contact 1 of relay M. It should be mentioned here that the release of relay L as just explained will also break the circuit to the coil 115 of the stepping switch A, since that circuit goes from arm 9 to contact 12 of relay L when energized. Release of arm 9 thus serves to keep the brush arms 114 in the No. 5 position, even when relay K has not been energized, while correct information on the standing tape is being transmitted to the new tape in perforator 97. Also it should be mentioned that tape boxes 10 and 11 are of the type disclosed in the Ackell application S.N. 522,209, filed July 15, 1955, now Patent 2,846,055, granted August 5, 1958, and are such that on retraction of the feeler pins circuits are completed through all of them but as they are permitted to rise to enter perforations in the tape the circuits are broken through those pins which cannot rise fully due to the absence of perforations in their paths. This explains why relay M is not energized during the tape feeding operation which accompanies the analyzing of successive lines of code number perforations in the tape.

Relay L when released by the tape feed signal as explained remains deenergized until the next L*f* signal in the standing tape, which precedes the code number perforations therein, is reached. Relays A1–A5 to D1–D5 will also be released on the energizing of relay I since the holding circuit for all of those groups of relays extends through arm 9 of relay I in released condition.

Now returning to the situation in which relays K, I and J have been energized and relay H has been released, the connections from the tape feed cam 30 will be switched over to the tape box 10 so that the latter will control the further punching of the new tape until the revised data for the particular stock number being dealt with is introduced into the new tape. The circuit for this purpose extends from positive bus 49 through arm 9 of relay I to contact 12 thereof, then through line 173, switch arms 174 and 175, the latter of which is operated by a cam 176 on the rotating shaft 22, then through line 177 to line 42 which, as previously explained, extends to the tape box 10 and has branches passing through the feeler pins 43 thereof. From the zero feeler pin the circuit extends through line 45*f* directly to relay EO and then to the negative bus at 48B. Any circuits completed through pins 1–5 of the box 10 extend through lines 46 and brush arms 47 which are at this time engaged with the group of contacts in position 5 of stepping switch B. These contacts are, as previously indicated, connected with contacts in the No. 1 position of switch B and the latter are connected with the lines 46*a* indicated in FIG. 3 as "To position 1 of B." From here circuits are completed through one or more of the relays A1–A5, according to which of the pins 1–5 in box 10 have been aligned with perforations. Those relays in the group A1–A5 which have thus been energized will operate their arms 127*a* to connect the positive bus 126 with corresponding ones of the five lines designated 123. These, as previously noted, extend to the contacts in position 1 of stepping switch A or to some group of contacts in a position interconnected therewith. Brush arms 114 of stepping switch A will be in one of these positions at the time under consideration and will, therefore, serve to extend the circuits to the corresponding contacts in the group 124. These, in turn, are connected through lines 125 with corresponding relays in the group E1–E5 and the circuits are then completed to the negative bus at 48*b*. Thus, the relays in the entire group E0–E5 will be energized or not in accordance with the presence or absence of perforations in the region of the tape being analyzed by the pins 43.

At this time the punches in the reperforator 97 will be operated in accordance with whichever ones of the relays E0–E5 may be energized. It should be noted in this connection that terminal 8 of Jones plug 101 connected with the perforator 97 is at this time connected with the positive bus at 38 (FIG. 8) adjacent the cam 40. The latter operates a switch 39 which connects the positive line to a line 41 which in turn connects with arm 3 of energized relay I. From here the circuit extends through lines 103*a* and 104 which, as previously noted, is connected with terminal 8 of Jones plug 101. From the latter the circuit continues through those coils 98 which correspond with the relays E0–E5 which are at this moment being energized. Assuming that relay E3 is energized, for example, the circuit extending through contact 3 of Jones plug 101 extends down to line 109 which is connected with contact 8 alined with coil E3. The adjacent arm of group 10 will be in engagement with this contact and will continue the circuit through line 180 down to arm 9 of released relay H and from this to the negative bus at 86.

After a line of perforations has been analyzed in the editing tape in box 10 and corresponding perforations have been punched in the new tape in box 97, each of these tapes is advanced one step. The stepping of the tape in box 10 is brought about by cam 30 which connects the negative bus line 31 through switch 29 with a line 181 leading to arm 4 of relay I. From here the circuit extends through line 24 to and through coil 10*a* of box 10 to the positive bus at 15. Stepping of the tape in perforator 97 is effected by solenoid coil 100 which it will be noted is in parallel with the tape feed hole perforating solenoid 99. Therefore, solenoid 100 is actuated along with the punch actuating solenoids but it does not advance the tape at this time. It simply retracts a pawl-carrying arm which, on release, turns a feed ratchet one step under spring action.

The new line of perforations in the editing tape will then be transmitted to the perforator 97 in the same manner as explained above and this mode of operation will continue until the revised data in the editing tape, for the particular stock number, has been transferred to the new tape. In this connection it should be noted that the circuits for stepping the brush arms in both of the stepping switches A and B will be interrupted at one or more points so that these arms will remain throughout this period in the No. 5 position or some other position which is interconnected with the contacts in No. 1 position. Thus the circuit to the stepping coil 33 of switch B is broken at arm 4 of released relay G while the circuit to stepping coil 115 of switch A is broken at arm 9 of relay L and also at arm 4 of relay H.

While the new data is being set up in the tape being punched in the perforator 97 under control of the editing tape in box 10 the old data with respect to the same stock carried by the tape in box 11 will be fed away. This is done under control of relay J which, as has been explained, is now in energized condition. The circuit for stepping the standing tape in box 11 may be traced as follows: From the positive bus 72 through line 73 and lines 89, 90 and 91 to line 182, which is connected with the arm 4 of the now energized relay J; from here the circuit continues through line 92 to line 28 and switch 29, the latter being connected through line 31 to a negative bus. This circuit will be completed upon each revolution of the cam 30 to step off the standing tape in this manner. It does not interfere with the control of the perforator 97 from the tape in box 10 even though the relays S0 to S5 are energized in accordance with the perforations in the standing tape. The circuits controlled by the relays S0 to S5 which, as previously explained, served to operate the punch actuating solenoids in perforator 97 will be broken at relay H which is at this time at rest. Note in this connection that line 113 forming a part of these circuits will not have its contact 12 in relay H engaged by arm 9 of the latter.

Returning now to the control of the reperforator by the editing tape in box 10 it will be noted in FIG. 10 that the last character in the matter identified with the particular stock number being entered is an L*f* signal. This, as has been explained, involves a perforation in only the No. 2 position of the tape. When this signal is analyzed the relay E will be energized in the same manner explained in relation to switch 12. The circuit for this purpose extends from the positive bus at 38 to switch 39, when the cam 40 lifts the movable arm of the latter, and then extends through line 41 to the arm 3 of the still energized relay I from which it continues through line 103*a* to the line 104. This, as previously explained, is connected with terminal 8 of Jones plug 101. From here the positive side of the line extends through a line 183 to a group of arms 184 of the relays E0–E5. The L*f* signal will have shifted the arm of this group identified with relay E2 toward the right so that a circuit is completed down to line 185. The latter extends downwardly and over to the right to connect with line 13 and thence to the coil 14 of relay E and to the negative bus line.

Energizing of relay E will, as before, energize relay G and will also reactivate stepping switch B and through the groups of relays A1–A5 to D1–D5 will set up the system to enter in the latter the new code number in the editing tape. Energizing of relay G releases relay I since the holding circuit of I goes through now disengaged contact 7 and arm 10 of relay G. Let it be assumed that the second correction to be made is of the character explained above involving merely a change in one or more of the figures identified with the particular code number now being set up. Upon completion of the storing in the relays A1–A5 to D1–D5 of the new code number and the analyzing of the T*f* signal which immediately follows the code number, the circuits will be modified through the various relays to transfer control over the reperforator back to the standing tape in box 11. However, the reperforating operation will not begin unless and until the operation of the standing tape identified with the preceding stock number has been fed away. The line feed (L*f*) signal at the end of that section of the standing tape serves to energize relay L which in turn releases relay J and thus stops the feeding away operation. Relay L is energized from a circuit beginning at positive bus 116 and extending through line 117, switch arms 118, line 119, coil 120 of relay L to line 91 then toward the left to line 182, arm 4 of still energized relay J, line 92, switch 28, 29 and line 31 to the negative bus. As stated, the energizing of relay L in this manner serves to release relay J. This is accomplished by opening the holding circuit for the latter at arm 3 of relay L. That circuit, as has been explained, is the one which energized relay J in the first instance. It extends from positive bus 72 through the cutout switch **11*b* in box 11 and through line 75 to the arm 3 of relay L. From here the circuit extends through arm 4 of relay K, which is still energized, and over to the switch 172*e* operated by cam 164*a***.

At this time relay K will be released. As has been explained there are three holding circuits for relay K and all of these will be interrupted at some point at the time now under consideration. One of these holding circuits involves the arm 11 of relay F at rest, but this relay is at this time energized in the manner previously explained because of the completion of the entry of the new code number on the editing tape in the groups of relays A1–A5 to D1–D5. Another holding circuit for the relay K is broken at the point between arm 9 of relay J and its contact 12. These will be separated upon the release of relay J. The other holding circuit for relay K, which extends from positive bus 131 (FIG. 5) through relay ZZ and relays Y, M and N, is broken at contact 2 of relay N which at this time is released so that its arm 4 is in the position indicated in FIG. 5.

The release of relay K by the breaking of the three holding circuits mentioned serves to place the system in condition for the control of the perforator 97 from the standing tape in box 11. At this time the same sequence of operations will take place, as has already been explained, namely, the L*f* signal at the beginning of the new entry in the standing tape will cause relay L to be energized and the next code number in the standing tape will be set up in the group of relays S0–S5 and compared, digit by digit, with the setting of the relays A1–A5 to D1–D5. Simultaneously the new code number in the standing tape will be duplicated in the new tape being punched by perforator 97. If the code number in the standing tape does not coincide with that stored in the relays A1–A5 to D1–D5, the rest of the data carried by the standing tape in relation to that particular stock will be transmitted to the perforator 97 and included in the new tape. This will continue until the standing tape reaches a point at which its stock code number being analyzed coincides with that stored from the editing tape at which time the switch over to the latter will occur in the same manner as has been explained.

Now let us assume that the next change to be made in the new tape does not involve correction of an entry in the old standing tape but rather the insertion of a new stock item in the list. Referring to FIG. 10, let us suppose that after the stock bearing code number 0002 there is to be inserted in the proper alphabetical order a new stock which will be given number 1122. To effect this insertion the editing tape will now carry perforations corresponding with the data indicated in FIG. 10. It will be noted that the stock number 0002 is preceded by the letter "*e*." This, as will be explained, will serve to permit the data on the old standing tape for stock number 0002 to be set up in the new tape but at the conclusion of such setting up the control over the perforator 97 will be swung over to the editing tape. The operation of the system for this purpose will now be explained.

As the perforation line in the editing tape which represents the letter "*e*" is analyzed the brush arms 47 of stepping switch B will be on the group of contacts in one or another of the positions designated 1, 5, 9, 13 and 17 so that circuits from the lines 46 will now be connected with the lines **46*a***, identified in FIG. 3 with "position 1 of B." The "*e*" signal in the editing tape involves a perforation in only the number 1 position, therefore relay A1 will be energized and the remaining relays in this group will be at rest. This results in energizing the relay O. The circuit for this purpose extends from the positive bus at 38 (FIG. 8) through contact 39 when closed by cam 40, line 41, arm 3 of now energized relay G, lines 42, **42*a*, arm 4 of now energized relay E, line 190 to and through arm 9 of relay EO, then through line 191 to a group of arms 192 forming parts of relays A1–A5. As stated, relay A1 will be energized, therefore its arm in group 192 will be shifted toward the right while the others will remain in the position shown. This completes a circuit to line 193, then through arm 9 of relay A3 to line 194 down to the lower end of the coil of relay O, the opposite end of which is connected through line 151 with a negative bus at 195. When the relay O is thus energized it is temporarily held by cam 164*b* (FIG. 7). The circuit for this purpose may be traced from positive bus 172*g* through switch 172*h*, 172*i*, to line 196 and branch line 197 to arm 4 of relay O, which is now shifted toward the left and connected with the lower end of the coil of relay O, the upper end of which is connected through line 151 with negative bus 195**.

Operation of relay O immediately causes operation of relay S. The circuit for this purpose may be traced from the negative bus at 195 through line 151, then branch line 198 to the coil of relay S, the opposite end of which is connected by line 199 with the arm 9 of the now energized relay O. From here the circuit continues through line 200 to arm 3 of the now energized relay E and then to the positive bus at that point. A holding circuit is created for relay S, this circuit having one branch extending through relay E in released condition and another branch extending through relay G in energized condition. This circuit may be traced from negative bus 195, line 151, line 198 to the coil of relay S, then through arm 4 of the latter down to line 201 and from this either along line 202 to arm 3 of relay E in released condition or through line 203 to line 62 and through this to arm 9 of relay G in energized condition, this arm being connected to positive at 61.

In connection with the foregoing it should be noted that in the course of analyzing the "*e*" designation in tape box 10 the tape feeding solenoid **10*a* will be energized through the circuits previously described under control of the cam 30. However, at this time the brush arms 47 of stepping switch B are not stepped, as in the previously described operation of transferring the readings on the editing tape to the storage relays. This is because the circuit through the brush arm stepping coil 33 is broken at the arm 10 of relay O which, as has been explained, is temporarily being held by the action of cam 164*b* and its related circuit. It will be noted that cam 164*b* is active throughout the interval in which cam 30 is active. Accordingly, the next revolution of the shaft 22 will cause sensing of the first line of perforations identified with the code number in the editing tape while the brush arms 47 are still in either the 1, 5, 9, 13 or 17 position. The system will at this time set up in the group of storage relays A1–A5 information corresponding with the first digit in the code number. At the same time the tape feeding solenoid 10*a* and the switch stepping solenoid 33 will be energized to bring about the feeding of the tape to the next digit and the stepping of the brush arms 47 to the next line of contacts i.e. 2, 6, 10, 14 or 18. In connection with the foregoing it will be noted that the circuit through the switch stepping coil 33 is no longer broken at the arm 10 of relay O, since this will have been released during the preceding cycle of shaft 22 as the switch 172*i* rides off of the cam 164*b***.

The set-up of the storage relays A1–A5 to D1–D5 in accordance with the code designation in the editing tape will continue until the 4th digit of the number has been set up in relays D1–D5. When this has been done a circuit will be completed from the contact 63 of stepping switch B through the related brush arm, which is at this time in its No. 4 position or a multiple thereof, to the line 62 which extends down to the positive bus at 61. In the opposite direction from stepping switch B, the circuit extends from contact 63 through line 64 to the coil of relay F and then to negative at 31 in the manner previously described. Energizing of relay F releases relays E and G and, in the manner explained before, switches the system over to the standing tape which then starts its control over the perforator 97 and also compares its code number designations with those set up in relays A1–A5 to D1–D5. The only difference in the circuits at this time, from that explained above in relation to the first operation, is that relay S is now energized rather than at rest. The system continues to function in the same manner as in the first-described operation until the standing tape arrives at the code number stored in the relays A1–A5 to D1–D5. However, when this occurs and the relays N, P, Q and R are energized as before, this will cause operation of relay T instead of causing operation of relay K. The circuit for this purpose extends from the positive bus at 38 through switch 39 and line 41, arm 6 of relay H and line 103 to lines 156, 157, 158 and 159, in energized relays N, P, Q and R, then through lines 160 and 161 to arm 10 of now energized relay S. From here it goes to contact 8 of relay S which is connected with the coil of relay T the opposite side of which is connected through line 198 and line 151 to the negative bus at 195. Relay T, when thus energized, is held by a circuit extending from negative at 195, through lines 151 and 198 to the coil of relay T, and then from the upper end of the latter to arm 4 of relay T and through lines 201 and 202 to arm 3 of released relay E, this arm being connected to positive. It should be noted that the energizing of relay T instead of relay K does not interrupt the control over the perforator 97 by the standing tape. It will be recalled that such interruption took place at arm 3 of relay K when the latter was energized.

The control of the perforator 97 by the perforations in the standing tape in box 11 will continue until the data identified with the particular stock number in question has been set up in the new tape and until the LF signal is reached at the beginning of the new entry in the standing tape. This signal, which involves a perforation in the No. 2 position, will bring about the closing of a circuit from positive bus 116 through the series of arms 118 of relay group S0–S5 then downwardly through line 204 to a line 205 over to arm 3 of relay T from which the circuit continues through line 206 up to line 207, which extends over to the left and then downwardly through the coil of a relay LL, then down to a switch 208 controlled by a cam 209 and down to negative at 210. Relay LL will be held momentarily, for the period determined by the high part of the cam 209, even though the circuit from positive to line 207 may be broken in the interim. The holding circuit extends from positive bus **210*a* to arm 4 of relay LL and then down through its coil and line 207 to the switch 208**.

Energizing of relay LL will bring about the energizing of relay U. The circuit for this purpose may be traced from the negative bus at 195 through lines 151, 198, the coil of relay U then over to arm 10 of energized relay T, then through line 211 to arm 10 of energized relay LL, then on through line 212 to arm 9 of relay J, at rest, down to the positive bus at **172*g*. Relay U when thus energized is held by a circuit extending from negative bus 195 through the coil of relay U over to arm 4 of this relay, which is now shifted toward the right, then through line 202 to arm 3** of relay E, at rest, which is connected to the positive bus shown.

Energizing of relay U brings about the energizing of relay I through a circuit which may be traced from the negative bus below the coil of relay I through line 165, switch arms 166, 167, line 168 to arm 10 of now energized relay U, and from here through line 169 to arm 9 of relay E, and then through line 17 to the positive bus at 15. When thus energized, relay I will be held, in the manner previously explained, by connection to positive bus 67 through switch 68 controlled by cam 69. Also the energizing of relay I releases relay H during the part of the cycle in which this is being held by the cam 69 since that circuit requires arm 10 of relay I to be in its rest position.

With relay H released and relay I energized, the control over the perforator 97 will be swung over from box 11 to box 10. The system will then operate in substantially the same manner as previously described to enter the number of the new stock, and all of the data concerning the same carried by the editing tape, in the new tape of perforator 97. It should be noted that at this time the stepping switches A and B will be in corresponding positions, i.e., 1, 5, 9, 13 or 17, so that the circuits through the analyzing pins of box 10 will extend to the perforator through lines 46 to the brush arms 47 and from these to the contacts in the No. 1 position of relay B, then through the lines **46*a*, identified with that position in FIG. 3, to the relays of group A1–A5 and then to negative at 48*a*. The relays A1–A5 carry current from plus bus 126 through selected switch arms 127*a*, then through the lines 123 extending down to switch A, and then through lines 125 up to relays E1–E5 and to negative at 48*b*. By thus energizing selected ones of these relays, circuits will be completed from the positive bus at 38 (FIG. 8), through arm 3 of relay I to point 104 which, as explained, is connected to terminal 8 of Jones plug 101, and then through the appropriate coils 98 in the perforator over to arms 10 of relays E0–E5 and through line 180 down to negative at 86 (FIG. 8) by way of arm 9 of relay H, which is at this time at rest. This procedure will continue for the successive lines of perforations in the editing tape, throughout the data identified with the new stock being inserted. The stepping of the tape in box 10 will at this time take place under control of cam 30 with its connection through line 181 and relay I, now energized, to line 24**. The stepping switches A and B will not be shifted during this period.

As shown in FIG. 10, the final character to be set up in the new tape is the L*f* signal. When this is reached in the editing tape the current from the positive line then delivered to terminal 8 of Jones plug 101, to energize the No. 2 punch in the perforator, will have a parallel circuit down through line 183, switch arms 184, line 185 to the coil of relay E and thus energize the latter. This places the system in condition for resumption of another complete cycle. If the next entry on the editing tape involves a correction of an existing item on the standing tape the system will operate in the same manner as first described. It should be noted in this connection that the energizing of relay E will release relays S, T and U, the holding circuits for which pass through arm 3 of relay E when the latter is at rest. Relay I will also be released during the interval in which it is being operated by cam 164 since the energizing circuit will at this time be broken at relay U and/or relay E.

Now let us assume that the next item on the editing tape is a further insertion rather than a correction of an existing item. The next item on the editing tape will then have an "*a*" signal in advance of the new entry to be made. This is shown in FIG. 10. The "*a*" signal involves perforations in the 1 and 2 positions of the tape. In analyzing this signal, while the brush arms 47 of switch B are in the No. 1, 5, 9, 13 or 17 position, the tape box 10 will cause relays A1 and A2 to be energized. This will complete a circuit from the bus 38 through switch 39, line 41, arm 3 of now energized relay G, lines 42, 42*a*, arm 4 of now energized relay E, line 190, to and through line 191 to the series of arms 192 which at this time will carry the circuit to line 215. The latter extends down to the coil of relay V, the opposite side of which is connected through lines 198 and 151 with the negative bus at 195. Relay VV is in parallel with relay V and will accordingly be energized at the same time. Relays V and VV are held momentarily by a circuit from line 198 through the coils of the relays to arm 10 of relay V and then through line 197 to line 196 and down through the switch 172*i*, controlled by cam 164*b*, to the positive bus 172*g*. The energizing of relay V causes relay U to be energized by a circuit which extends from the positive bus at relay E through arm 3 of the latter to line 200, then through arm 4 of relay V to line 216 which is connected with one end of the coil of relay U, the opposite end of this coil being connected to line 198 which, as explained, extends to the negative side of the line at 195. It will be noted that the "*a*" signal will not have been transmitted to the perforator since the latter will not yet have been set up for control by the editing tape box 10, which requires relay I to be energized and this is not done until a later point in the cycle. Also, it should be noted that the "*a*" signal will not cause the stepping of switch B because the circuit for this purpose will be broken at arm 3 of relay V. However, the tape feed coil 10*a* in box 10 will be energized in this cycle to advance the tape in this box one step. The circuit for this purpose is controlled by cam 30, as previously explained.

The energizing of relay V also energizes relay F. The circuit for this purpose extends from a positive bus at 214 (FIG. 6) to arm 9 of relay V, which now engages contact 12 and connects into line 64 which extends to coil 65 of relay F. The circuit is completed through lines 66 and 26, arm 4 of relay G, which is still energized, and then through switch 28, 29 to the negative bus at 31. Energizing of relay F releases relay E and also relay G in the manner previously explained. This is important since relay G in energized condition serves to create a circuit periodically through the stepping coil 33 of switch B. In the present instance it is desired to eliminate this stepping and leave the switch arms 47 on the contacts in the No. 1 or equivalent position of switch B as the perforations identified with the new entry are being transmitted to the perforator 97.

With relay G released, the relay U serves to energize relay I by a circuit extending from negative below the coil of relay I, through line 165, switch 166, lines 167 and 168 to arm 10 of relay U, then through line 169 to arm 9 of released relay E and then through line 17 to positive at 15. Relay I is then held, as explained, by the joint action of cams 164 and 69. Relay U when energized is held by a circuit extending from negative at 195, through line 198 to the coil of U, then to arm 4 of the latter to line 202 and arm 3 of released relay E to positive. Prior to release of relays E and G, the holding circuit for relay U extended momentarily to positive at 61 through lines 203 and 62 and arm 9 of relay G.

It will be understood that the release of relay H and the energizing of relay I will have served to disconnect box 11 from the perforator and to connect box 10 to the perforator. The system will now operate in the manner previously described until the number of the new stock and the data for it is transmitted from the editing tape in box 10 to the perforator 97 and is set up in the new tape therein. It will be recalled that this involves transmission of the signals from the analyzing pins in box 10 to the contacts in position 1 of stepping switch B and from these to the lines 146*a*, designated "Position 1 of B" in FIG. 3. This causes selected relays in group A1–A5 to be energized and corresponding circuits to set up from positive bus 126 through the operated switch arms 127*a* of relays A1–A5 to lines 123 down to corresponding contacts in position 1 of stepping switch A, these being connected with corresponding relays in the group E1–E5 which then control circuits to the appropriate coils 98 in the perforator 97. The control of the perforator 97 by the tape in box 10 will continue until the final signal for the new stock is reached. This, as shown in FIG. 10 is an L*f* signal. When this is reached the circuit completed to terminal 8 of Jones plug 101 from positive at 38, to energize the No. 2 punch of the perforator, will have a parallel circuit leading down to negative through line 183, switch arms 184, line 185, through the coil of relay E and thence to negative. Relay E is thus energized for the resumption of a new cycle. If this involves a further new entry the same series of events, as just explained, will take place. On the other hand, if the next entry on the editing tape represents a correction to be made in an existing item on the standing tape, the system will operate in the manner first described. It should be noted in this connection that the energizing of relay E will release all of the relays S, T and U, the holding circuits for which pass through arm 3 of relay E when the latter is released. Relay I will also be released during that part of the cycle of shaft 22 when this relay is being held by cam 164 since the circuit is then broken at relay U and/or relay E.

Now let us assume that the next entry on the editing tape involves a deletion of one of the entries appearing on the standing tape as, for example, when a particular stock listed on the latter has been dropped. Assuming that this entry which is to be deleted follows stock No. 0004, the entry on the editing tape for that code number will be preceded by the letter "*s*," as shown in FIG. 10. Now with relay E energized and relay G also energized from E, as has been explained, the analysis of the "*s*" in the editing tape by pins 43 in box 10 will set up circuits through pins 1 and 3. These circuits transmitted through lines 146 to brush arms 47, now engaged with the contacts in the No. 1 position in stepping switch B, will be transmitted to relays A1 and A3 as previously explained. This will bring about completion of a circuit as follows: From positive bus 38 through switch 39, line 41, arm 3 of relay G, lines 42, 42*a*, arm 4 of energized relay E, line 190 to line 191, then through switch arms 192 to the line 217, it being noted that the arm in group 192 of relay A1 and arm 9 of relay A3 will at this time be shifted toward the right. From line 217 the circuit extends to the coil of relay W and then through line 218 to line 219 and on to the negative bus at 96 (FIG. 2). The "*s*" signal will not, however, be transmitted to the perforator since the circuit for this purpose would need to extend through relay I in energized condition and this at the moment is released. Relay W will be held temporarily through a part of the revolution of shaft 22 by the cam 164*b*. The circuit for this purpose may be traced from line 218 connected with negative bus 96 through the coil of relay W to arm 4 of the latter, which is now shifted toward the right, then through line 220 to line 196 down to switch arm 172*i* and from the latter to line 172*h* connected with the positive bus 172*g*.

Upon the energizing of relay W, relay X will also be energized. The circuit for this purpose extends from the negative bus 96 through lines 219 and 218 to the coil of relay X then through line 221 to arm 10 of relay W which is connected through line 222 over to the right and down to line 200 which extends to arm 3 of relay E, now in energized condition. The circuit is completed to the positive bus connected with said arm. Once the relay X has been energized it will be held until the system reaches the point at which the deletion is to take place and until the completion of the deletion operation. So long as relays W and E are energized relay X is, of course, held by the circuit thus traced. When relay E is released, the relay X is held by a circuit from the positive side of the coil to arm 4 and then through lines 223 and 224 over to line 201 and then upwardly toward relay U to line 203 and from this to line 62 which at this time is connected to the positive bus 61 through arm 9 of energized relay G. A second holding circuit for relay X may be traced from line 201 down through line 202 to arm 3 of relay E when the latter is released. Thus when relay E is released at a subsequent stage in the operation of the system, relay G will still be energized momentarily and the holding circuit for relay X will extend through arm 9 of relay G as explained. Shortly thereafter relay G will be released but relay X will then be held by the last-mentioned holding circuit to arm 3 of relay E released.

After the "*s*" signal has energized relay X, as explained, the code number appearing in the editing tape following "*s*" will be set up in relays A1–A5 to D1–D5. It should be noted in this connection that the "*s*" signal will not have stepped the brush arms 47 of switch B because the circuit for this purpose is broken at arm 3 of energized relay W. Also the holding circuit for relays A1 and A3 energized by the "*s*" signal will be broken at arm 9 of still energized relay W so that these relays will not be held. However, the tape in box 10 will be stepped by the usual circuit so that on the next cycle of shaft 22 the first digit of the code number will be transmitted to relays A1–A5. Brush arms 47 will at this time be in engagement with the contacts of position 1 of switch B, or one of the connected group of contacts. At this time relay W will have been released so that the holding circuit for the energized relays of group A1–A5 will be effective and the stepping circuit for the brush arm 47 will be closed at the proper point in the cycle of shaft 22 so that the next group of perforations identified with the next digit of the code number will be transmitted to relays B1–B5. The same cycle will be repeated until all four of the digits of the number are set up in the relays of groups A1–A5 to D1–D5. As the fourth digit of the number is thus set up in relay D1–D5, a circuit will be completed through lines 62 and 64 down through relay F in the manner previously explained. This will bring about the release of relay E and will also bring about the release of relay G. Relay H will be energized by the circuit from positive bus 72 (FIG. 1) through lines 73, 75, 76 and 78 up and over to the right to arms 79 of relays D1–D5 and back through line 80, arm 3 of relay J and lines 81 and 82 to switch 83 which is controlled by cam 84 and completes the circuit to the negative bus at 86. This places the system in condition for control of the perforator 97 from the standing tape in the manner previously explained. The setting up in the new tape of perforations corresponding with those in the standing tape in box 11 will continue until all of the relays N, P, Q and R are energized, in the manner previously explained, when the code number of the stock being analyzed in the standing tape corresponds with that set up in the relays A1–A5 to D1–D5. When this occurs relay X will energize relay Y. The circuit for this purpose extends from the positive bus at 38 (FIG. 8) through lines 102, 103, 156 to 160 to arm 10 of energized relay X to contact 8 connected by line 225 with the coil of relay Y and from here to negative through lines 218 and 219 to bus 96 (FIG. 2). Relay Y is held by the connection from its positive side through arm 4 to lines 223 and 224 and lines 201 and 202 to arm 3 of the relay E now released.

The energizing of relay Y serves to energize relay Z through relay LL when the entry preceding the item to be deleted has been completed. In this connection it will be noted that the L*f* signal at the end of the preceding entry will complete a circuit from the positive bus 116 (FIG. 2) through switch arms 118 to line 204 which connects into arm 10 of energized relay Y. From here the circuit extends through line 207 and through the coil of relay LL down to switch 208 which is connected with the negative bus at 210. When relay LL is thus energized relay Z will be energized by a circuit extending from negative at 96 (FIG. 2) through lines 219 and 218 to the coil of relay Z, then through line 226 and arm 3 of relay Y to line 227 which is connected into line 211 and the contact 8 with arm 10 of now energized relay LL. From here the circuit continues down through line 212 and arm 9 of relay J to the positive bus at 172*g*. Relay Z is held by a circuit extending to positive through its arm 4, line 228 and lines 224, 201 and 202 to arm 3 of relay E in released condition. Relay Z, in turn, energizes relay J by a circuit extending from positive bus 72 (FIG. 4) through lines 73 and 75, arm 3 of relay L, lines 75*a* and 229 (FIGS. 4 and 5) to arm 10 of relay Z, then through line 230 to switch 172*e*, when closed by cam 164*a*, and finally through line 172*f* and the coil of relay J to the negative bus. Relay J, when so energized, is held by the circuits previously explained and serves to energize intermittently the tape feed coil 11*a* of the standing tape box 11 so as to feed away the data on the standing tape relating to the stock now being deleted. This operation is performed in the same manner as has been explained for the correction of the data in the standing tape. Relays X, Y and Z are held until the deletion operation has been completed. At the end of such deletion the L*f* signal in the standing tape which is transmitted to relays S0–S5 will bring about the release of relays X, Y and Z. This is accomplished by a circuit which extends from positive bus 116 through line 117, arms 118 to line 204 then to arm 10 of relay Y and from here through line 207 to the coil of relay LL which is connected to the negative bus 210 through switch 208 operated by cam 209. The temporary energizing of relay LL will cause operation of relay E by a circuit extending from positive bus 172*g* to arm 9 of relay J, now engaged with contact 12 thereof, then through line 212*a* to arm 3 of relay LL, and then by line 231 to line 13 which extends to coil 14 of relay E and then to negative at that point. Energizing of relay E in this manner will break the holding circuits for relays X, Y and Z since at this time the effective holding circuit for X is through arm 3 of E in released condition, and the holding circuits for relays Y and Z come to the same point. Release of relay Z will also release relay J during the time it is being held by cam 164*a*, which requires arm 10 of relay Z to be engaged with contact 8.

This will begin a new cycle in which the next code number appearing in the editing tape of box 10 will be set up in the relays A1–A5 to D1–D5 if the next change to be made is a correction in an existing entry. Assuming, however, that the next change involves the deletion of a further item immediately following the one just deleted then the edit tape would present a "*u*" signal which involves perforations in the 1, 2 and 3 positions across the tape. This signal, when transmitted to relays A1–A5 will cause a circuit to be completed from the positive bus 38, through switch 39, line 41, arm 3 of relay G, lines 42, 42*a*, arm 4 of energized relay E, line 190 to and through line 191 and arms 192 to a line 232 which extends to the coil of relay ZZ and from the latter through lines 218 and 219 to the negative bus 96. This energizes relay ZZ, which is then held temporarily by the same connection on the negative side and by the connection from the upper end of the coil of ZZ with arm 4 thereof to a line 233 which extends down first toward the left and then toward the right to line 70, the latter being connected to the positive bus 67 so long as cam 69 is active. Energizing of relay ZZ will in turn energize relay Z and hold the same for one cycle. The circuit for this purpose may be traced from negative bus 96 through lines 219 and 218 to the coil of relay Z then through line 226 to arm 3 of relay ZZ and from here down through lines 222, 200 and arm of energized relay E to the positive bus at that point. When relay Z is thus energized relay J will be energized in the manner explained above. This will cause the feeding away of the standing tape, without operation of the perforator 97 to reproduce the data concerning the particular stock which is being deleted. The circuit through coils 98 of the perforator will be broken at this time between line 113 and arm 9 of relay H, which is now released. The "*u*" signal will not have been transmitted to the perforator since the circuits through the coils 98 will have been broken at that time between arms 3 of released relays H and I and the lines 103 and 103*a*, respectively. It should be noted that the circuit for stepping the switch B will be broken at arm 9 of relay ZZ. Similarly the circuit for stepping the switch A will be broken at arm 9 of relay L and arm 4 of relay H, both of these relays being at this time in released condition. The L*f* signal appearing at the end of the line of information being fed away will energize relay E as before to start a new cycle. This may be of any of the types hereinabove described, that is, a substitution, an insertion or a further deletion. If it is the latter, the editing tape will simply have the "*u*" signal repeated to cause the last-described cycle of the system to be repeated.

In all the foregoing discussion it has been assumed that switch 77 is in its "edit" position in which the arms of the switch extend upwardly to close circuits to lines 78 and 122. Provision is made for adapting the system to simply duplicate in the perforator 97 a tape corresponding with that being analyzed in standing tape box 11. For this purpose the arms of switch 77 are swung downwardly so that line 76 is connected to line 80 while line 121 is dead ended. When the switch 77 is in this condition, the relay H will be energized without the necessity of energizing any of the relays of group D1–D5. The circuit for this purpose may be readily traced from positive bus 72 (FIG. 1) through line 73, cutout switch 11*b*, line 75, branch line 76, switch 77 to line 80, then through arm 3 of relay J to line 81 and over to arm 3 of relay K, through line 82, then through switch 83 and line 85 to the coil of relay H which is connected to negative at 86. At the same time the stepping switch A will be disconnected from control by the standing tape in box 11. This is because of the break between line 121 and line 122 at switch 77. The system is thus placed in condition for continuous perforation of the new tape in the perforator 97 in accordance with the data on the standing tape.

When it is desired at any time to restore the system to its initial setting, with the circuits in the condition shown in FIGS. 1–9, the resetting switch 234 (FIG. 9) may be operated. This switch is normally engaged with a contact at the end of line 235 which extends to all of the negative bus lines heretofore described. It will be noted that the switch 234 thus normally connects the negative side of all circuits to line 236 which extends to the negative side of the direct current power source indicated. It will be apparent that when switch 234 is shifted out of engagement with line 235 all of the circuits in the system which are completed through any of the relays thereof will be broken so that all of the relays will be restored to their initial settings shown in the drawings. At the same time switch 234 will connect the negative line 236 extending from the power source to the contact at the end of line 238 which extends up to a contact in stepping switch B, which is in the arcuate group designated I. It will be recalled that contacts 2, 3, 4, 6, 7, 8, 10, 11, 12, 14, 15, 16, 18, 19 and 20 of this group are interconnected, Contact 2 of this group is connected by line 239 to contact 2 of group I in stepping switch A. Now assuming that the brush arms 47 of stepping switch B are in the No. 2 position, a circuit will be completed through one of these arms to a line 240 and from here through a switch arm 241 to the solenoid 33 of switch B and then to the positive bus at 32. This will cause stepping of the arms 47 to the next position. In the course of such stepping the switch 241 will be opened, either by mechanical connections within the switch B or by the provision of a vibratory circuit breaking arm in switch 241, but will be promptly closed again so that another impulse will be sent through the solenoid 33. This will shift the switch arms 47 to the No. 4 position where the same operation will take place and the switch arms will then shift to the No. 5 position. Here the described circuit through the solenoid 33 will be broken since the No. 5 contact of group I is not connected with line 238. This leaves stepping switch B in the desired condition for starting up the system again.

Stepping switch A is operated in substantially the same way by the connection from line 238 through line 239 to the No. 2 contact of group I of switch A. When the brush arms 114 in this switch are in the No. 2 position the circuit will continue through the line 242 to a switch 243 similar to switch 241, and then on to solenoid 115 and the positive bus above this. Switch 243 is intermittently opened and closed in the same manner as switch 241 so that the brush arms 114 will be stepped along until they reach the No. 5 position, at which time switch A will be in the desired condition.

As has been explained, the circuits involved in the new system include a large number of rectifiers each of which is indicated by an arrow head abutting the straight transverse line, the arrangement being such that current will flow from positive only in the direction in which the arrow head points.

By the various circuits described above, all of the desired changes from the data provided in a previously existing standing tape may be made in the new tape being punched by reperforator 97, these changes being determined by the editing tape in box 10.

The reperforator 97, in accordance with the present invention, is preferably of an improved type in which separate solenoids or electromagnets are provided for the several punches which produce the perforations in the tape. It is not necessary to select all of the punches to be operated in forming a single line of perforations and then operate a separate hammer or platen to drive the punches to perform their function. The improved perforator contemplated by the present invention is capable of much more rapid operation than prior perforators of the character involving a common platen or the like for driving all of the selected punches to form a line of perforations. It has been found that the new perforator exceeds the speed of prior perforators by as much as 60 percent.

Figure 12:
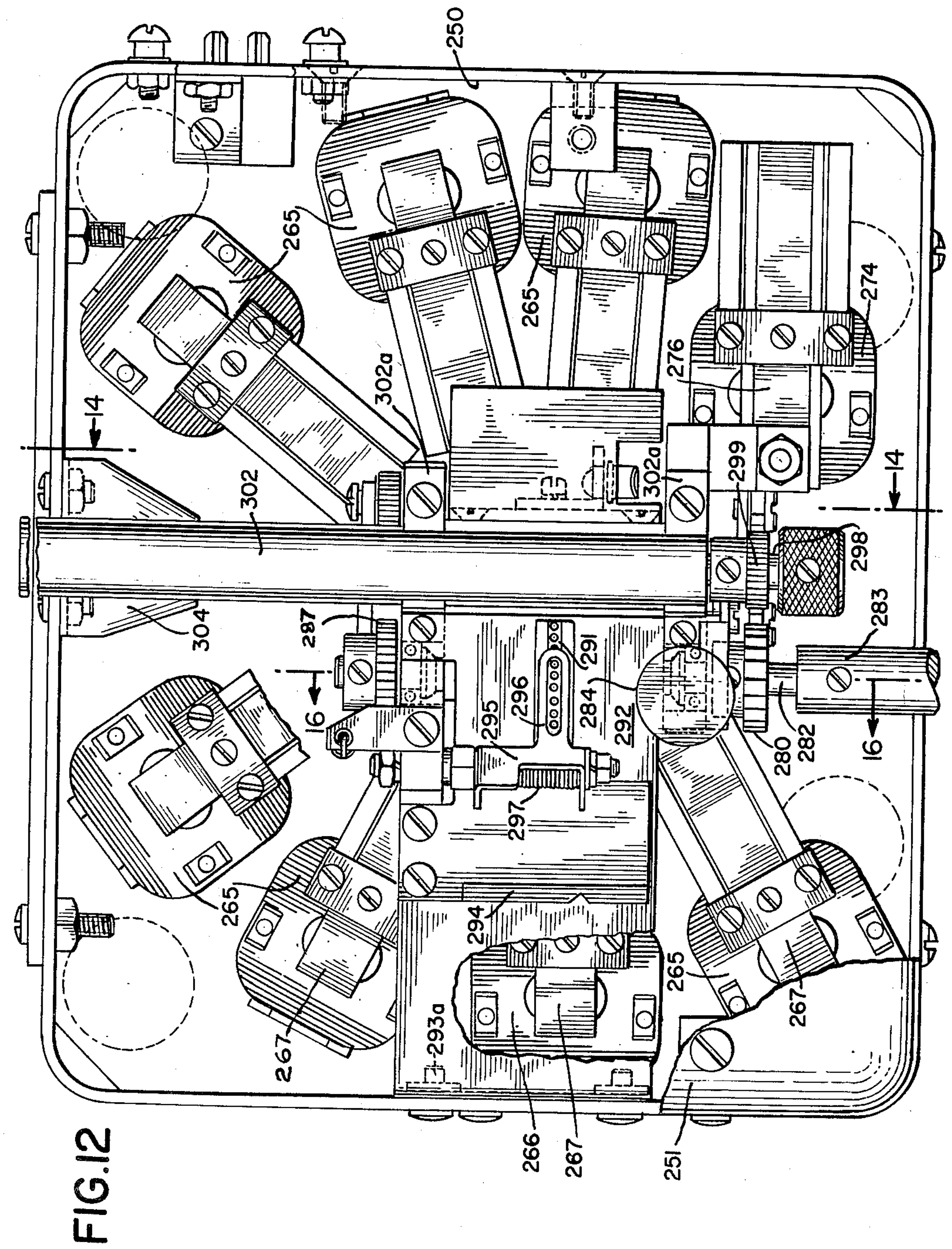
FIG. 12 is a plan view of the improved tape punching device employed in the new system.
Figure 13:
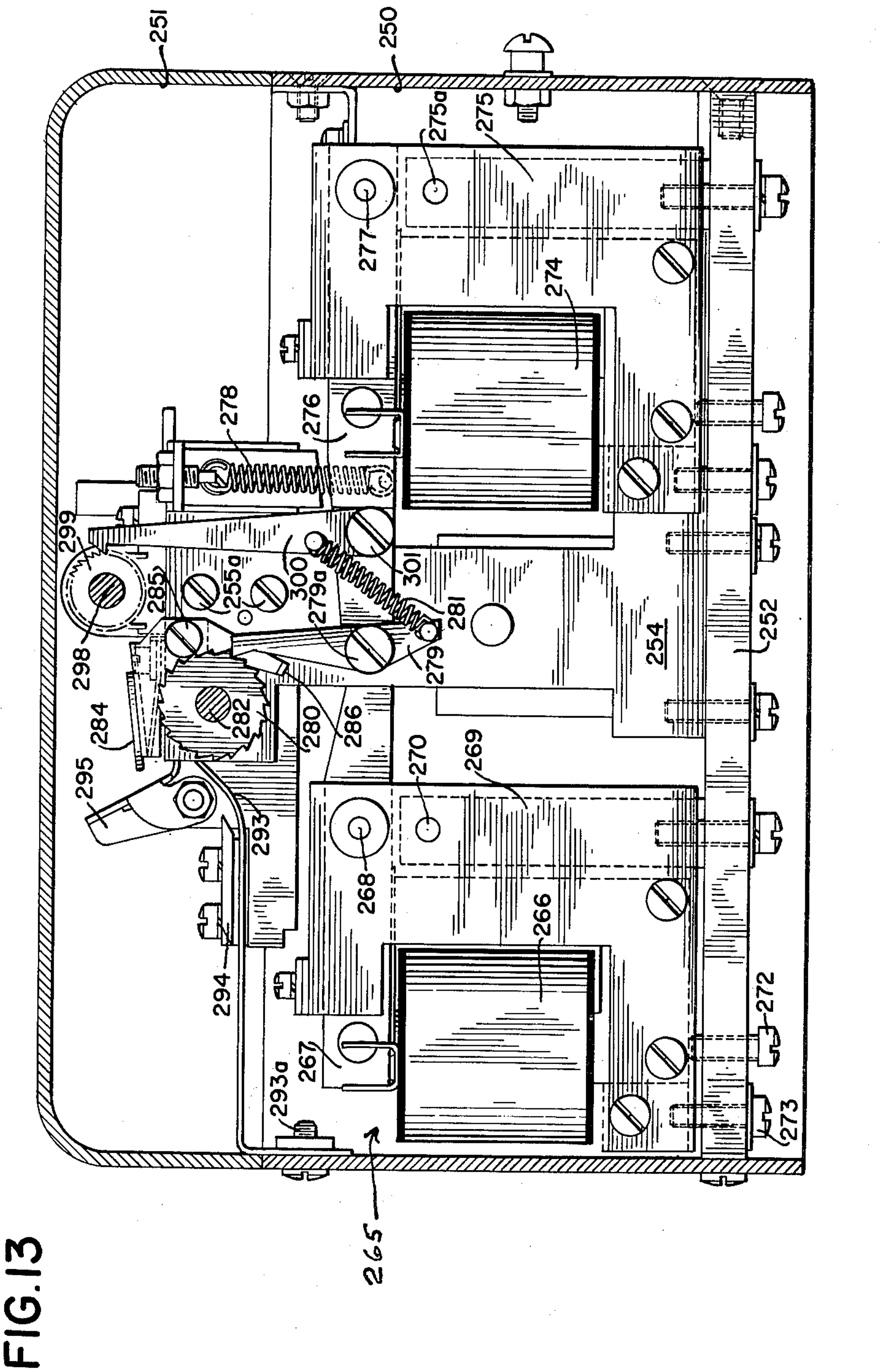
FIG. 13 is a view, largely in elevation but partly in vertical section, of the improved tape punching device.

Referring now to FIGS. 12–22, inclusive, the general construction of the new perforator is shown. It involves a main frame or housing 250 having a removable cap 251 at its top. Adjacent the bottom of the housing there is provided a base or platform 252 which serves to support various devices within the housing. Rubber bumper elements 253 are secured to the undersurface of the base plate 252 to permit the perforator to be supported on a flat surface and to minimize the transmission of vibrations from the perforator to the supporting surface or vice versa. Within the main housing there are various upright supports, as indicated at 254. These are arranged to carry a punch block assembly 255 by means of screws of the like 255*a* (FIG. 13).

Figures 17, 18, 19:
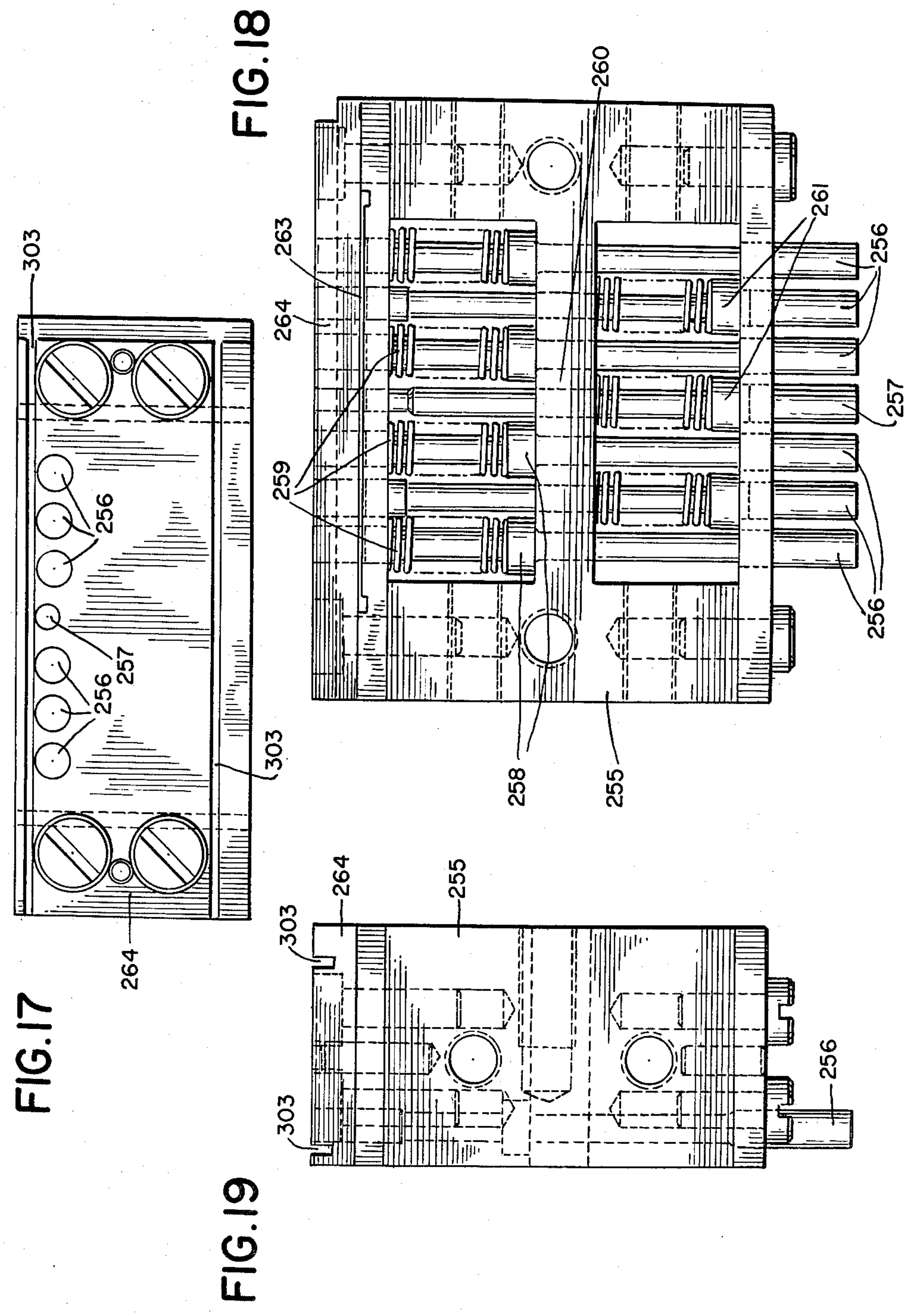
FIG. 17 is a plan view of a punch block assembly embodied in the new tape punching device.
FIG. 18 is a front elevational view of said assembly.
FIG. 19 is a side elevational view of said assembly.

In FIGS. 17, 18 and 19, the details of the punch block assembly 255 are shown. It involves a main frame of H configuration adapted to receive and guide for vertical movement a plurality of punches 256 and 257. The punches 256 are adapted to form the perforations in the tape which represent, in code form, the character or signal to be provided in successive portions of the tape. Punch 257 is adapted to provide a succession of tape advancing perforations in the tape. These perforations are preferably somewhat smaller than the others and therefore the upper end of punch 257 is of reduced diameter. The first, third, fourth and sixth punches 256 have secured thereto a collar 258 adapted to cooperate with the upper surface of a cross bar 260 of the frame. These punches are urged downwardly by springs 259 to hold the collars against the cross bar. At their upper ends the springs cooperate with a plate extending across the top of the H frame. Similarly, the second and fifth punches 256 and the tape feed perforation punch 257 are provided with collars 261 which are urged downwardly by springs 262 into engagement with a bottom plate of the punch block. By the alternate arrangement of the springs 259 and 262, above and below the cross bar 260, a very compact construction is provided, with springs of suitable diameter and with the punches in a desirable closely spaced relationship. When the punches are in their normal position shown in FIG. 18, their upper ends are slightly below a slot 263 extending horizontally through the assembly and through which the tape to be punched is advanced. A top plate 264 of the block assembly provides the upper surface of the slot and this plate is provided with holes to receive the upper ends of the punches and also the punchings removed thereby from the tape.

For operating the punches 256 and 257, seven separate electromagnets 265 (FIG. 12) are provided. Each of these is arranged to operate one of the punches. The construction of one of the magnets is best shown in FIG. 13. It embodies a coil 266 surrounding a central core of suitable construction which provides a relatively strong magnetic field when the coil is energized, arranged to act upon an armature carried by the overlying end of a lever 267. This lever is pivotally mounted at 268 in a frame 269. Preferably, a ball bearing unit, or similar anti-friction unit, is provided around the pivot 268 to permit the lever 267 to oscillate freely. Frame 269 is suitably mounted on a pivot 270 carried by a bracket secured to the base plate 252 of the housing. Adjusting screws 272 and 273 are provided for varying the angular position of the frame about its pivot 270 and thus vary the gap between the core of the magnet and the overlying armature carried by the lever 267. The latter, at its free end (not shown), is of reduced dimension and suitably bent to be positioned directly beneath and in engagement with the bottom of one of the punches 256 and 257. When current is supplied to the coil 266 of the magnet, the lever 267 is rocked in a counterclockwise direction and its free end serves to urge the related punch 256 or 257 upwardly against the action of its spring 259 or 262. In the preferred construction, the magnet is capable of applying a force of about 8 lbs. to the punch. As any punch is lifted its upper end is forced through the tape in the slot 263 to provide a perforation therein.

Figure 14:
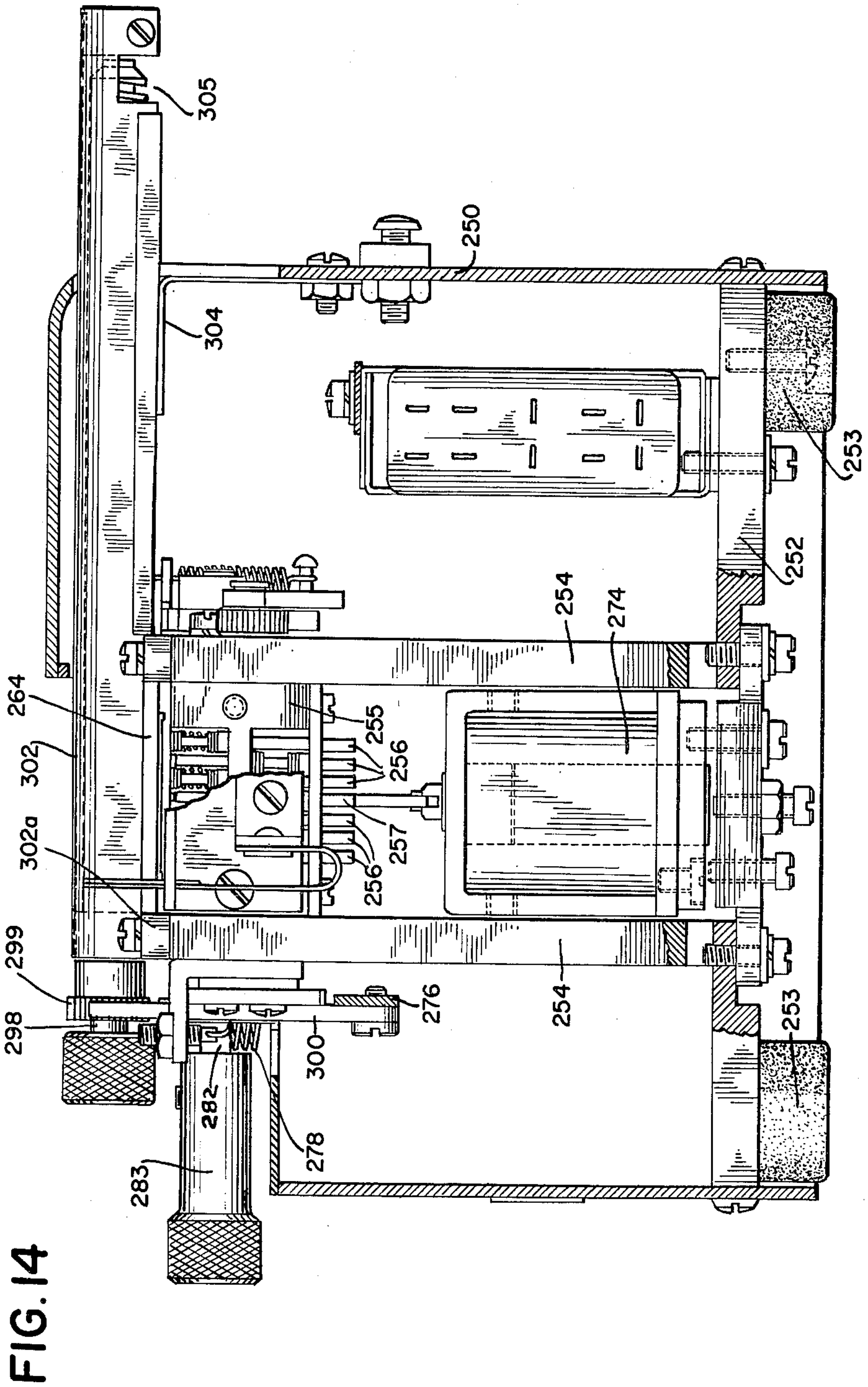
FIG. 14 is a transverse vertical sectional view through the tape punching device taken substantially along the line 14—14 of FIG. 12.
Figure 15:
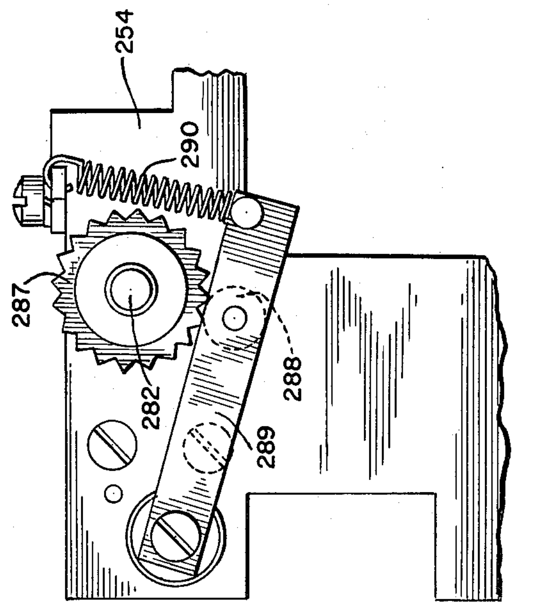
FIG. 15 is a detail view, in elevation, showing a detent employed in connection with the tape feeding mechanism of the new tape punching device.

An electromagnet similar to the magnet 265 is provided for feeding the tape. This tape feed magnet has a coil 274 mounted in a frame 275. A suitable core within the coil sets up a magnetic field, when the coil is energized and serves to attract an armature carried by the overlying end of a lever 276 which is pivotally mounted, through a ball bearing unit or the like, on a pin 277 carried by the frame 275. Provision is made for adjusting the angular position of frame 275 about a pivotal supporting pin 275*a* in a manner similar to that described in relation to the magnets 265. Lever 276 is normally urged in a clockwise direction about its pivot 277 by means of a spring 278. At its left, or free end (FIG. 13), the lever 276 carries a pawl 279 arranged to cooperate with a ratchet 280. A spring 281 urges the pawl 279 into engagement with the ratchet by pivotal action about the screw stud 279*a*. Ratchet 280 is secured to a shaft 282 having also secured thereto an enlarged head 283 which, as shown in FIG. 14, is knurled at its outer end to permit turning of the shaft 282 by hand. The shaft may be freely turned in a counterclockwise direction at any time, to advance the tape manually, and it may be turned in a clockwise direction, to retract the tape, upon depressing an arm 284 of a lever pivotally mounted on one of the brackets 254 by a screw stud 285. The lower end of this lever has a laterally extending finger 286 which cooperates with the pawl 279 to disengage it from the teeth of the ratchet when the arm 284 is depressed. As the coil 274 of the tape feeding magnet is energized the arm 276 is rocked downwardly, or in a counterclockwise direction, and thus carries the pawl 279 past the next tooth on the ratchet 280. This is simply an idle movement. Feeding of the tape does not take place until the solenoid is deenergized and spring 278 restores the lever 276 to its upper position. In FIG. 15 there is shown means for preventing rotation of the ratchet and the shaft 282 upon the downward movement of the pawl 279 and for also insuring feeding of the tape a predetermined extent. This comprises a toothed wheel 287 which is secured to the shaft 282 and is engaged by a roller 288 carried by an arm 289. The latter is drawn upwardly by a spring 290 into one of the spaces between the teeth on the wheel 287. This arrangement is such that when the pawl 279 shifts the ratchet 280 a sufficient distance to cause the roller 288 to pass over the high point on a tooth of the wheel 287, the latter will complete its step of movement under the action of the spring 290.

Figure 16:
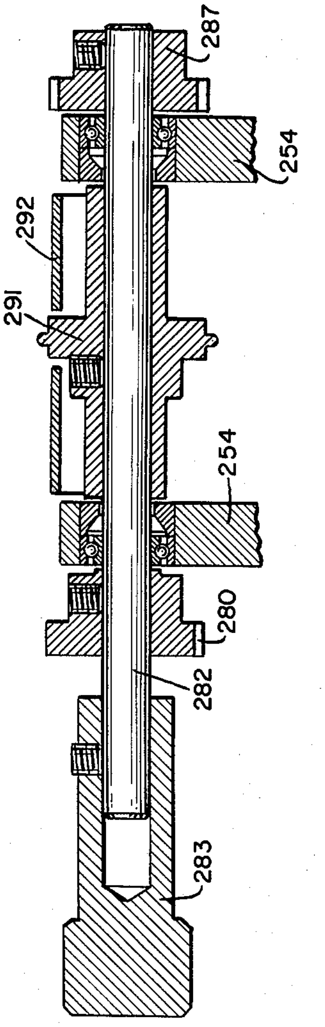
FIG. 16 is a vertical sectional view taken along the line 16—16 of FIG. 12.

Secured to the shaft 282 in a plane extending along the longitudinal center line of the tape to be advanced is a pin wheel 291. The pins of the latter are adapted to enter the previously punched tape feed holes in the tape to advance the same. Feed wheel 291 extends upwardly through a narrow opening in a plate 292 over which the tape is advanced (FIGS. 12 and 16). The plate 292 merges into a downwardly sloping guide surface 293 which carries the tape beneath a tear off blade 294. This enables the tape to be severed at any suitable point. A spring urged lever 295, having an arm 296 which extends over the pin wheel 291 and is provided with an opening arranged to permit the free passage of the pins of said pin wheel, serves to hold the tape engaged with the latter. As best shown in FIG. 12, the lever 295 is rocked, into the position indicated, by a spring 297. It may be readily disengaged from the pin wheel by a manual rocking movement in opposition to the spring.

Figure 20:
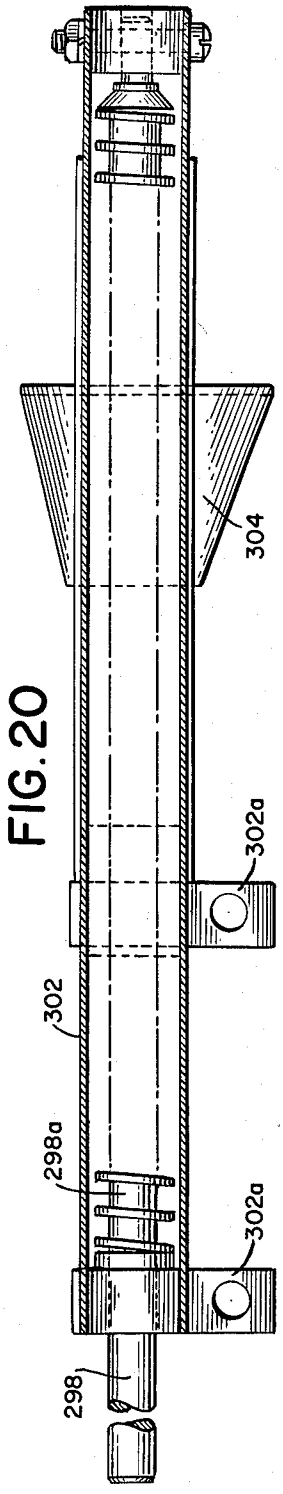
FIG. 20 is a plan view of a conveyer for removing punchings from the region in which they are punched from the new tape, a tubular housing for the conveyer being shown in section.
Figures 21, 22:
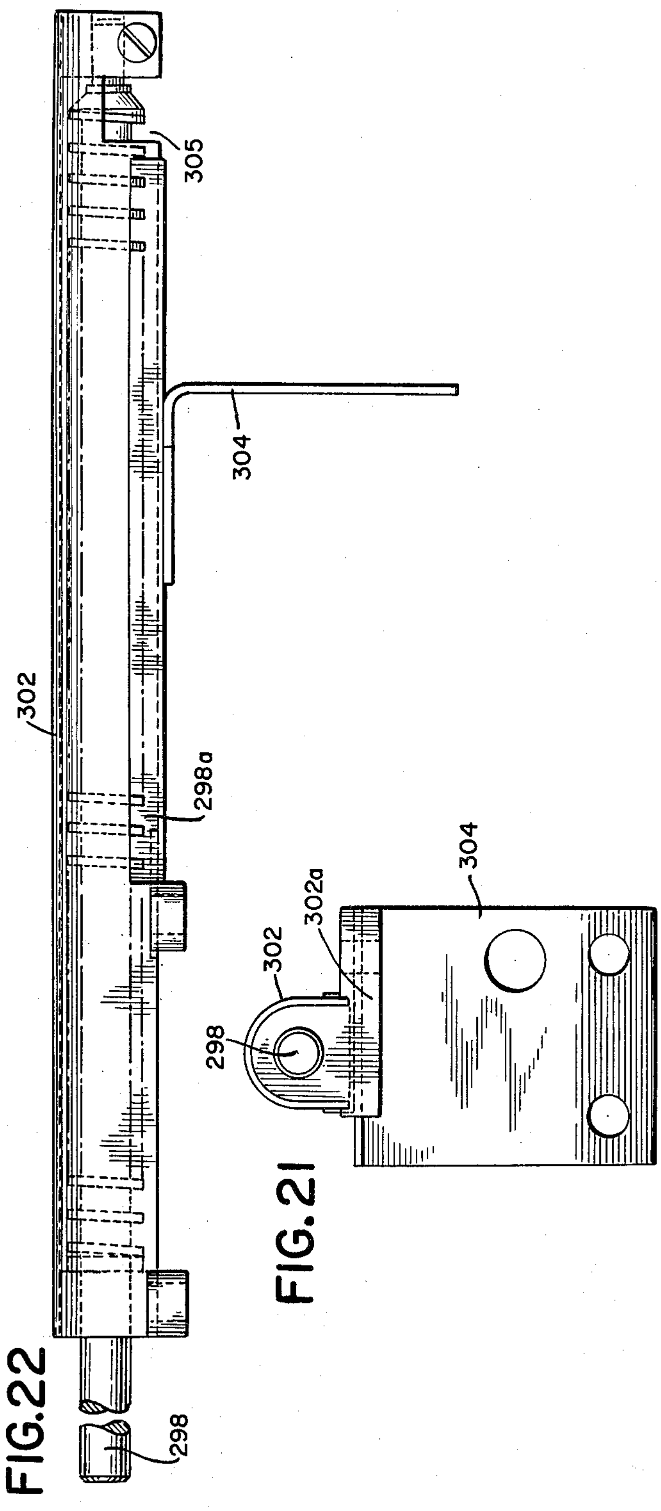
FIG. 21 is a side elevational view of the conveyer.
FIG. 22 is a front elevational view of the conveyer.

Provision is made in the new perforator for the removal of the scrap created by the perforation of the tape. This comprises a shaft 298 which extends across the top of the punch block and to a point outwardly of the housing 250. Throughout the major portion of its length, the shaft 298 is provided with a spiral formation 298*a* which, upon rotation of the shaft, serves to advance the punchings toward the right (FIGS. 20 and 22). For rotating the shaft, there is secured thereto a ratchet 299 with which cooperates a pawl 300 pivotally mounted, by means of a screw stud 301, upon the lever 276. The spring 281 serves to draw the pawl 300 toward the left (FIG. 13) into engagement with the ratchet. It will be seen that as the lever 276 is rocked downwardly by the energizing of the magnet 274, the ratchet 299 will be turned. The successive rotations of the shaft, upon the repeated operations of the lever 276, are sufficient to advance the punchings in the manner described. It should be mentioned in this connection that the punchings are forced upwardly gradually by the punches, through the openings in the top plate 264 of the block assembly until they are forced into the path of the spiral formations on the shaft 282. The stroke of the punches, to serve their purpose, need only be about .015 of an inch so that an accumulation of punchings may gather in the several holes in the plate 264 before the uppermost one is brought into the path of the spiral formation on shaft 298. But from then on successive punchings are thus brought into removal position. A hood 302 encloses the spirally grooved portion of shaft 298, this hood being attached to the top of the punch block by screws or the like cooperating with openings in lateral extensions 302*a*. Hood 302 is of inverted U-shape formation and its free edges are fitted into longitudinal grooves 303 in the top plate 264 of the punch block. Adjacent the right wall of the housing 250 (FIG. 14) the conveyor formed by the spirally grooved shaft 298 and the hood 302 is supported by a bracket 304. Outside of the housing 250 the hood 302 and its bottom closure are provided with an opening 305 through which the punchings may be discharged into a suitable receptacle.

It is believed that the construction and mode of operation of a preferred embodiment of the invention will be clear from the foregoing. However, it should be understood that various modifications may be made in the construction and arrangement of the various elements and devices employed in the system, and their specific interrelationship and mode of operation, without departing from the general principles and scope of the invention as defined by the appended claims.

What is claimed is:

1. Apparatus for producing a revised control tape having lines of signal control means across the same representing information in accordance with a predetermined code system and having interspersed lines of signal control means representing code numbers for different portions of said information in accordance with said code system, which comprises means for separately advancing and analyzing successive lines of signal control means in an existing tape to be revised and in an editing tape carrying lines of signal control means indicating the revisions to be made in the existing tape, said editing tape being provided with code number designations corresponding with those in the existing tape at points at which revisions are to be made in the existing tape, means for first causing said analyzing means to analyze a code number designation in the editing tape, means controlled by said analyzing means for storing said code number designation, means controlled by said editing tape upon analysis of certain signal control means therein for initiating operation of the analyzing means for the existing tape, means for effecting a comparison of successive digits of the code number designation in the existing tape with those stored from said editing tape, said last-mentioned means including a plurality of current responsive devices connected in series with each other and adapted to complete an electrically conductive circuit path in response to the comparison of identical code number designations, means for forming signal control means in a revised tape under control of said existing tape to duplicate the entries therein until the code number designation therein coincides with that stored from said editing tape, and means responsive to the completion of said path for then controlling the formation of signal control means in the revised tape in accordance with the change from the existing tape which is indicated by the signal control means in the editing tape.

2. Apparatus of the character set forth in claim 1 in which said means for storing said code number designations comprises a plurality of banks of relays, and in which circuits are provided from said analyzing means for the editing tape to said banks of relays for energizing selected relays in each bank.

3. Apparatus of the character set forth in claim 2 in which said circuits from said analyzing means for the editing tape to said banks of relays pass through a stepping switch which selectively connects said analyzing means with the relays in successive banks.

4. Apparatus of the character set forth in claim 3 in which said means for effecting a comparison of the code number designations in the existing tape with those stored in the banks of relays under control of the editing tape comprises a stepping switch which serves to complete circuits for step-by-step comparison of code number digits in the existing tape with corresponding digits of the code number in the editing tape stored in said banks of relays.

5. Apparatus of the character set forth in claim 2 including relays responsive to a certain signal in the editing tape in advance of a code number designation therein to disable operation of said means for forming signal control means in a revised tape when the code number designations analyzed in the existing tape coincide with the code number designations stored in said banks of relays, thereby deleting from the revised tape the immediately succeeding item in the existing tape.

6. Apparatus of the character set forth in claim 2 including relays responsive to a certain signal in the editing tape in advance of a code number designation therein to switch control over said means for forming signal control means in a revised tape to said editing tape when the code number designations analyzed in the existing tape coincide with the code number designatoins stored in said banks of relays, thereby causing insertion of a new item in said revised tape.

7. Apparatus of the character set forth in claim 2 in which said plurality of current responsive devices includes a group of relays so correlated with said banks of relays that control over said means for forming signal control means in a revised tape is shifted from said existing tape to said editing tape when the code number designations in a section of said existing tape coincide with the code number designations stored in said banks of relays.

8. Apparatus of the character set forth in claim 5 which includes relay means responsive to a second different certain signal in the editing tape for disabling operation of said means for forming signal control means in a revised tape for another item in said existing tape immediately following the previous item in the existing tape deleted from said revised tape.

9. Apparatus of the character set forth in claim 6 which includes relay means responsive to a second different certain signal in the editing tape for continuing control of said means for forming signal control means in a revised tape from said editing tape immediately following the previous item inserted in the revised tape.

10. Apparatus of the character set forth in claim 1 which includes relay means for causing said existing tape to be stepped off without controlling said means for forming signal control means in a revised tape for a section of said existing tape which corresponds with a section of the editing tape that controls said means for forming signal control means in a revised tape.

11. Apparatus of the character set forth in claim 5 which includes relay means for causing said existing tape to be stepped off without controlling said means for forming signal control means in a revised tape for a section of said existing tape which is to be deleted.

12. Apparatus of the character set forth in claim 1 in which said means for forming signal control means in said revised tape comprises perforating means for the revised tape having a plurality of punches, one for each of a plurality of perforation positions across the tape, and a separate electrical device for operating each of said punches to perforate the tape as said punch is selected for operation.

13. Apparatus of the character set forth in claim 1 in which separate relays are provided one of which, upon being energized, serves to place the means for forming signal control means in the revised tape under control of the existing tape and the other of which, upon being energized, serves to place the means for forming signal control means in the revised tape under control of the editing tape.

14. Apparatus of the character set forth in claim 1 which includes a plurality of electrical circuits for controlling the operation of said means for forming signal control means in the revised tape, and a plurality of selectively operated relays and a plurality of rectifiers for closing selected circuits to effect the desired revisions of the existing tape to be made in the revised tape.

15. Apparatus of the character set forth claim 1 which includes a plurality of electrical circuits for controlling the operation of said means for forming signal control means in said revised tape, a constantly rotating shaft, a plurality of cams mounted thereon for rotation therewith, and a plurality of switches operated by said cams for controlling the closing of selected ones of said plurality of circuits.

16. Apparatus of the character set forth in claim 4 which includes a manually operable switch arranged to bring about automatic stepping of said stepping switches to positions required for the initiation of a new cycle of operation of the apparatus.

17. Apparatus of the character set forth in claim 1 which includes a plurality of electrical circuits for advancing and analyzing said existing and editing tapes and for controlling the formation of signal control means in said revised tape, and a manually operable switch for initiating the operation of the apparatus when the parts are all in a predetermined position.

18. Apparatus of the character set forth in claim 1 which includes electrical circuits and devices for advancing and analyzing said existing and editing tapes and controlling the formation of signal control means in the revised tape, and a manually operable switch for disabling the controls from the means for analyzing the editing tape and causing the existing tape alone to control the operation of said means for forming signal control means in the revised tape.

References Cited in the file of this patent

UNITED STATES PATENTS

| | | |
|---|---|---|
| 1,852,202 | Crumrine | Apr. 5, 1932 |
| 1,863,097 | Borel | June 14, 1932 |
| 2,091,769 | Rice | Aug. 31, 1937 |
| 2,407,411 | Folis | Sept. 10, 1946 |
| 2,543,435 | Buckley | Feb. 27, 1951 |
| 2,711,794 | Ghertman | June 28, 1955 |
| 2,744,578 | Mallina | May 8, 1956 |
| 2,762,485 | Bafour et al. | Sept. 11, 1956 |
| 2,850,095 | Royden | Sept. 2, 1958 |